(12) United States Patent
Trevisan et al.

(10) Patent No.: US 10,651,496 B2
(45) Date of Patent: May 12, 2020

(54) MODULAR PAD FOR A FUEL CELL SYSTEM

(71) Applicant: BLOOM ENERGY CORPORATION, Sunnyvale, CA (US)

(72) Inventors: David Trevisan, San Jose, CA (US); Arne Ballantine, Palo Alto, CA (US); Jessica Mahler, Mountain View, CA (US); Ross Parker, Santa Clara, CA (US); Christian Daco, Sunnyvale, CA (US); Gilbert Richards, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 1009 days.

(21) Appl. No.: 15/061,673

(22) Filed: Mar. 4, 2016

(65) Prior Publication Data

US 2016/0260996 A1    Sep. 8, 2016

Related U.S. Application Data

(60) Provisional application No. 62/129,509, filed on Mar. 6, 2015.

(51) Int. Cl.
*H01M 8/249* (2016.01)
*H01M 8/2484* (2016.01)

(52) U.S. Cl.
CPC ......... *H01M 8/249* (2013.01); *H01M 8/2484* (2016.02); *H01M 2250/10* (2013.01); *Y02B 90/14* (2013.01); *Y02P 90/40* (2015.11)

(58) Field of Classification Search
None
See application file for complete search history.

(56) References Cited

U.S. PATENT DOCUMENTS

| | | |
|---|---|---|
| 3,453,087 A | 7/1969 | Herp, Jr. et al. |
| 3,453,146 A | 7/1969 | Bawa et al. |

(Continued)

FOREIGN PATENT DOCUMENTS

| | | |
|---|---|---|
| CN | 101147285 A | 3/2008 |
| CN | 101295792 A | 10/2008 |

(Continued)

OTHER PUBLICATIONS

Ahmad-Khantou et al., "Electrochemical & Microstructural Study of SOFC Cathodes Based on $La_{0.5}Sr_{0.3}MnO_3$ and $Pr_{0.65}Sr_{0.3}MnO_3$," Electrochemical Society Proceedings, 2001, p. 476-485, vol. 2001-16.

(Continued)

*Primary Examiner* — Barbara L Gilliam
*Assistant Examiner* — Nathanael T Zemui
(74) *Attorney, Agent, or Firm* — The Marbury Law Group PLLC

(57) ABSTRACT

A pad for a fuel cell system includes a base having an upper surface, a separator disposed on the upper surface of the base, frames disposed on the separator and configured to support modules of the fuel cell system, and plumbing disposed between the upper surface of the base and the frames, and connected to the fuel cell modules. The separator is configured to space apart the frames and the upper surface of the base. The base may include modular sections that may be arranged in a linear configuration, a rectangular configuration, an orthogonal configuration, or a stepped configuration.

4 Claims, 20 Drawing Sheets

(56) References Cited

U.S. PATENT DOCUMENTS

| | | |
|---|---|---|
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,052,532 A | 10/1977 | Tannenberger |
| 4,098,722 A | 7/1978 | Cairns et al. |
| 4,182,795 A | 1/1980 | Baker et al. |
| 4,190,559 A | 2/1980 | Retallick |
| 4,272,353 A | 6/1981 | Lawrance et al. |
| 4,315,893 A | 2/1982 | McCallister |
| 4,342,816 A | 8/1982 | Kothmann et al. |
| 4,365,007 A | 12/1982 | Maru et al. |
| 4,374,184 A | 2/1983 | Somers et al. |
| 4,402,871 A | 9/1983 | Retallick |
| 4,426,269 A | 1/1984 | Brown et al. |
| 4,430,304 A | 2/1984 | Spurrier et al. |
| 4,459,340 A | 7/1984 | Mason |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,575,407 A | 3/1986 | Diller |
| 4,647,516 A | 3/1987 | Matsumura et al. |
| 4,654,207 A | 3/1987 | Preston |
| 4,657,829 A | 4/1987 | McElroy et al. |
| 4,670,359 A | 6/1987 | Beshty et al. |
| 4,678,723 A | 7/1987 | Wertheim |
| 4,686,158 A | 8/1987 | Nishi et al. |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,792,502 A | 12/1988 | Trocciola et al. |
| 4,804,592 A | 2/1989 | Vanderborgh et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,847,173 A | 7/1989 | Mitsunnaga et al. |
| 4,848,034 A | 7/1989 | Pace |
| 4,865,926 A | 9/1989 | Levy et al. |
| 4,898,792 A | 2/1990 | Singh et al. |
| 4,904,548 A | 2/1990 | Tajima |
| 4,913,982 A | 4/1990 | Kotchick et al. |
| 4,917,971 A | 4/1990 | Farooque |
| 4,925,745 A | 5/1990 | Remick et al. |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,363 A | 1/1992 | Reiser |
| 5,084,632 A | 1/1992 | Farooque |
| 5,091,075 A | 2/1992 | O'Neill et al. |
| 5,100,743 A | 3/1992 | Narita et al. |
| 5,143,800 A | 9/1992 | George et al. |
| 5,162,167 A | 11/1992 | Minh et al. |
| 5,169,730 A | 12/1992 | Reichner et al. |
| 5,170,124 A | 12/1992 | Blair et al. |
| 5,171,645 A | 12/1992 | Khandkar |
| 5,175,062 A | 12/1992 | Farooque et al. |
| 5,187,024 A | 2/1993 | Matsumura |
| 5,192,334 A | 3/1993 | Rohr et al. |
| 5,212,022 A | 5/1993 | Takahashi et al. |
| 5,213,910 A | 5/1993 | Yamada |
| 5,215,946 A | 6/1993 | Minh |
| 5,227,256 A | 7/1993 | Marianowski et al. |
| 5,232,792 A | 8/1993 | Reznikov |
| 5,246,791 A | 9/1993 | Fisher et al. |
| 5,256,499 A | 10/1993 | Minh et al. |
| 5,270,127 A | 12/1993 | Koga et al. |
| 5,273,837 A | 12/1993 | Aiken et al. |
| 5,290,323 A | 3/1994 | Ryoichi |
| 5,290,642 A | 3/1994 | Minh et al. |
| 5,302,470 A | 4/1994 | Okada et al. |
| 5,324,452 A | 6/1994 | Allam et al. |
| 5,328,779 A | 7/1994 | Tannenberger et al. |
| 5,340,664 A | 8/1994 | Hartvigsen |
| 5,342,705 A | 8/1994 | Minh et al. |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,368,667 A | 11/1994 | Minh et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | McElroy |
| 5,516,344 A | 5/1996 | Corrigan |
| 5,518,829 A | 5/1996 | Satake et al. |
| 5,527,631 A | 6/1996 | Singh et al. |
| 5,532,072 A | 7/1996 | Spaeh et al. |
| 5,573,867 A | 11/1996 | Zafred et al. |
| 5,589,017 A | 12/1996 | Minh |
| 5,589,285 A | 12/1996 | Cable et al. |
| 5,601,937 A | 2/1997 | Isenberg |
| 5,641,585 A | 6/1997 | Lessing et al. |
| 5,686,196 A | 11/1997 | Singh et al. |
| 5,688,609 A | 11/1997 | Rostrup-Nielsen et al. |
| 5,688,610 A | 11/1997 | Spaeh et al. |
| 5,693,201 A | 12/1997 | Hsu et al. |
| 5,730,213 A | 3/1998 | Kiser et al. |
| 5,733,675 A | 3/1998 | Dederer et al. |
| 5,741,406 A | 4/1998 | Barnett |
| 5,741,605 A | 4/1998 | Gillett et al. |
| 5,763,114 A | 6/1998 | Khandkar et al. |
| 5,773,160 A | 6/1998 | Wilkinson et al. |
| 5,914,200 A | 6/1999 | Schabert et al. |
| 5,922,488 A | 7/1999 | Marucchi-Soos et al. |
| 5,955,039 A | 9/1999 | Dowdy |
| 5,993,989 A | 11/1999 | Baozhen |
| 6,013,385 A | 1/2000 | DuBose |
| 6,051,125 A | 4/2000 | Pham et al. |
| 6,080,500 A | 6/2000 | Fuju et al. |
| 6,106,964 A | 8/2000 | Voss et al. |
| 6,106,967 A | 8/2000 | Virkar et al. |
| 6,228,521 B1 | 5/2001 | Kim et al. |
| 6,238,816 B1 | 5/2001 | Cable et al. |
| 6,280,865 B1 | 8/2001 | Eisman et al. |
| 6,287,716 B1 | 9/2001 | Hashimoto et al. |
| 6,329,090 B1 | 12/2001 | McElroy et al. |
| 6,348,278 B1 | 2/2002 | LaPierre et al. |
| 6,361,892 B1 | 3/2002 | Ruhl et al. |
| 6,376,111 B1 | 4/2002 | Mathias et al. |
| 6,383,670 B1 | 5/2002 | Edlund et al. |

(56) References Cited

U.S. PATENT DOCUMENTS

| | | |
|---|---|---|
| 6,403,245 B1 | 6/2002 | Hunt |
| 6,436,562 B1 | 8/2002 | DuBose |
| 6,451,466 B1 | 9/2002 | Grasso et al. |
| 6,464,586 B1 | 10/2002 | Kamata et al. |
| 6,489,050 B1 | 12/2002 | Ruhl et al. |
| 6,495,279 B1 | 12/2002 | Bogicevic et al. |
| 6,531,243 B2 | 3/2003 | Thom |
| 6,558,831 B1 | 5/2003 | Doshi et al. |
| 6,582,842 B1 | 6/2003 | King |
| 6,582,845 B2 | 6/2003 | Helfinstine et al. |
| 6,592,965 B1 | 7/2003 | Gordon |
| 6,605,316 B1 | 8/2003 | Visco et al. |
| 6,623,880 B1 | 9/2003 | Geisbrecht et al. |
| 6,656,625 B1 | 12/2003 | Thompson et al. |
| 6,677,070 B2 | 1/2004 | Kearl |
| 6,682,842 B1 | 1/2004 | Visco et al. |
| 6,691,702 B2 | 2/2004 | Appel et al. |
| 6,749,958 B2 | 6/2004 | Pastula et al. |
| 6,767,662 B2 | 7/2004 | Jacobson |
| 6,787,261 B2 | 9/2004 | Ukai et al. |
| 6,797,425 B2 | 9/2004 | Blanchet |
| 6,803,141 B2 | 10/2004 | Pham et al. |
| 6,811,913 B2 | 11/2004 | Ruhl |
| 6,821,663 B2 | 11/2004 | McElroy et al. |
| 6,854,688 B2 | 2/2005 | McElroy et al. |
| 6,924,053 B2 | 8/2005 | McElroy |
| 6,972,161 B2 | 12/2005 | Beatty et al. |
| 6,979,511 B2 | 12/2005 | Visco et al. |
| 7,008,465 B2 | 3/2006 | Graham et al. |
| 7,067,208 B2 | 6/2006 | Gottmann et al. |
| 7,150,927 B2 | 12/2006 | Hickey et al. |
| 7,157,173 B2 | 1/2007 | Kwon |
| 7,255,956 B2 | 8/2007 | McElroy et al. |
| 7,494,732 B2 | 2/2009 | Roy et al. |
| 7,546,938 B2 | 6/2009 | Panasik et al. |
| 7,550,217 B2 | 6/2009 | Kwon |
| 7,563,503 B2 | 7/2009 | Gell et al. |
| 7,601,183 B2 | 10/2009 | Larsen |
| 7,601,459 B2 | 10/2009 | An et al. |
| 7,713,649 B2 | 5/2010 | Hickey et al. |
| 8,440,362 B2 | 5/2013 | Richards et al. |
| 2001/0049035 A1 | 12/2001 | Haltiner, Jr. et al. |
| 2002/0006535 A1 | 1/2002 | Woods et al. |
| 2002/0012825 A1 | 1/2002 | Sasahara et al. |
| 2002/0014417 A1 | 2/2002 | Kuehnle et al. |
| 2002/0028362 A1 | 3/2002 | Prediger et al. |
| 2002/0028367 A1 | 3/2002 | Sammes et al. |
| 2002/0058175 A1 | 5/2002 | Ruhl |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2002/0142208 A1 | 10/2002 | Keefer et al. |
| 2002/0192516 A1 | 12/2002 | Tajima |
| 2003/0031904 A1 | 2/2003 | Haltiner, Jr. |
| 2003/0049502 A1 | 3/2003 | Dickman et al. |
| 2003/0157386 A1 | 8/2003 | Gottmann et al. |
| 2003/0162067 A1 | 8/2003 | McElroy |
| 2003/0165732 A1 | 9/2003 | McElroy |
| 2003/0196893 A1 | 10/2003 | McElroy et al. |
| 2003/0205641 A1 | 11/2003 | McElroy et al. |
| 2003/0235725 A1 | 12/2003 | Haltiner, Jr. et al. |
| 2004/0081859 A1 | 4/2004 | McElroy et al. |
| 2004/0089438 A1 | 5/2004 | Valensa et al. |
| 2004/0131912 A1 | 7/2004 | Keefer et al. |
| 2004/0180253 A1 | 9/2004 | Fisher |
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0217732 A1 | 11/2004 | Zhu et al. |
| 2004/0224193 A1 | 11/2004 | Mitlitsky et al. |
| 2005/0026011 A1 | 2/2005 | Suzuki et al. |
| 2005/0048334 A1 | 3/2005 | Sridhar et al. |
| 2005/0048336 A1 | 3/2005 | Takebe et al. |
| 2005/0048338 A1 | 3/2005 | Kobayashi et al. |
| 2005/0056412 A1 | 3/2005 | Reinke et al. |
| 2005/0074650 A1 | 4/2005 | Sridhar et al. |
| 2005/0164051 A1 | 7/2005 | Venkataraman et al. |
| 2005/0170235 A1 | 8/2005 | Hu et al. |
| 2005/0227134 A1 | 10/2005 | Nguyen |
| 2005/0249988 A1 | 11/2005 | Pearson |
| 2005/0271919 A1 | 12/2005 | Hata et al. |
| 2006/0008682 A1 | 1/2006 | McLean et al. |
| 2006/0040168 A1 | 2/2006 | Sridhar |
| 2006/0147771 A1 | 7/2006 | Russell et al. |
| 2006/0166070 A1 | 7/2006 | Hickey et al. |
| 2006/0188763 A1 | 8/2006 | Bai et al. |
| 2006/0210841 A1 | 9/2006 | Wallace et al. |
| 2006/0216575 A1 | 9/2006 | Cassidy |
| 2006/0222929 A1 | 10/2006 | Hickey et al. |
| 2006/0248799 A1 | 11/2006 | Bandhauer et al. |
| 2006/0251934 A1 | 11/2006 | Valensa et al. |
| 2006/0251939 A1 | 11/2006 | Bandhauer et al. |
| 2006/0251940 A1 | 11/2006 | Bandhauer et al. |
| 2007/0017368 A1 | 1/2007 | Levan et al. |
| 2007/0017369 A1 | 1/2007 | Levan et al. |
| 2007/0045125 A1 | 3/2007 | Hartvigsen et al. |
| 2007/0082254 A1 | 4/2007 | Hiwatashi |
| 2007/0141423 A1 | 6/2007 | Suzuki et al. |
| 2007/0141443 A1 | 6/2007 | Brown |
| 2007/0141444 A1 | 6/2007 | Brown |
| 2007/0224481 A1 | 9/2007 | Suzuki et al. |
| 2007/0237999 A1 | 10/2007 | Donahue et al. |
| 2007/0243435 A1 | 10/2007 | Dutta et al. |
| 2007/0259242 A1 | 11/2007 | Schaevitz et al. |
| 2007/0275292 A1 | 11/2007 | Sin Xicola et al. |
| 2007/0287048 A1 | 12/2007 | Couse et al. |
| 2008/0010959 A1 | 1/2008 | Gillingham et al. |
| 2008/0029388 A1 | 2/2008 | Elangovan et al. |
| 2008/0038600 A1 | 2/2008 | Valensa et al. |
| 2008/0075984 A1 | 3/2008 | Badding et al. |
| 2008/0076006 A1 | 3/2008 | Gottmann et al. |
| 2008/0096080 A1 | 4/2008 | Batawi et al. |
| 2008/0102337 A1 | 5/2008 | Shimada |
| 2008/0254336 A1 | 10/2008 | Batawi |
| 2008/0261099 A1 | 10/2008 | Nguyen et al. |
| 2009/0029195 A1 | 1/2009 | Gauckler et al. |
| 2009/0029208 A1 | 1/2009 | Katikaneni et al. |
| 2009/0053569 A1 | 2/2009 | Perry et al. |
| 2009/0068533 A1 | 3/2009 | Fukasawa et al. |
| 2009/0130530 A1 | 5/2009 | Tanaka |
| 2009/0186250 A1 | 7/2009 | Narendar et al. |
| 2009/0214919 A1 | 8/2009 | Suzuki et al. |
| 2009/0246566 A1 | 10/2009 | Craft, Jr. et al. |
| 2009/0291347 A1 | 11/2009 | Suzuki et al. |
| 2010/0018396 A1 | 1/2010 | Ding et al. |
| 2010/0035109 A1 | 2/2010 | Weingaertner et al. |
| 2011/0281185 A1 | 11/2011 | Sridhar et al. |
| 2012/0189940 A1* | 7/2012 | Richards ............... H01M 8/06 429/471 |
| 2013/0280635 A1 | 10/2013 | Richards et al. |
| 2014/0272612 A1 | 9/2014 | Trevisan et al. |

FOREIGN PATENT DOCUMENTS

| | | |
|---|---|---|
| DE | 19822697 | 10/1998 |
| EP | 0398111 A1 | 11/1990 |
| EP | 0977294 B1 | 2/2000 |
| EP | 1501146 A2 | 1/2005 |
| GB | 1048839 A | 11/1966 |
| JP | 60235365 | 11/1985 |
| JP | 3196465 A | 8/1991 |
| JP | 05-047408 | 2/1993 |
| JP | 6215778 | 8/1994 |
| JP | 2000-281438 | 10/2000 |
| JP | 2005-044727 | 2/2005 |
| KR | 20020092223 A | 12/2002 |
| KR | 20070095440 A | 9/2007 |
| KR | 20080010737 A | 1/2008 |
| KR | 20080097971 | 11/2008 |
| KR | 100886239 B1 | 2/2009 |
| KR | 20090061870 A | 6/2009 |
| WO | WO1994018712 | 8/1994 |

(56) References Cited

FOREIGN PATENT DOCUMENTS

| WO | WO2004/013258 | 2/2004 |
|---|---|---|
| WO | WO2004/092756 | 10/2004 |
| WO | WO2004/093214 | 10/2004 |
| WO | WO2005/041329 | 5/2005 |
| WO | WO2008/019926 | 2/2008 |
| WO | WO2009/097110 | 8/2009 |

OTHER PUBLICATIONS

Mori et al., "Lanthanum Alkaline-Earth Manganites as a Cathode Material in High-Temperature Solid Oxide Fuel Cells," Journal of the Electrochemical Society, 1999, p. 4041-4047, vol. 146.

L.G. Austin, "Cell & Stack Construction: Low Temperature Cells," Fuel Cells: A Review of Government-Sponsored Research, 1950-1964, NASA SP-120, 1967.

EG & G Services, Parsons, Inc., SAIC, Fuel Cell Handbook, 5th Edition, USDOE, Oct. 2000, p. 9-1-9.4, and 9-12-9-14.

J.M. Sedlak, et al., "Hydrogen Recovery and Purification Using the Solid Polymer Electrolyte Electrolysis Cell," Int. J. Hydrogen Energy, vol. 6, p. 45-51, 1981.

Dr. Ruhl, "Low Cost Reversible Fuel Cell System," Proceedings of the 2000 U.S. DOE Hydrogen Program Review, Jun. 15, 2000, NREL/CP-570-30535.

"Low Cost, Compact Solid Oxide Fuel Cell Generator," Technology Management Inc., (no date available), 1pg.

Low Cost, High Efficiency Reversible Fuel Cell (and Electrolyzer) Systems, Proceedings of the 2001 DOE Hydrogen Program Review NREL/CP-570-30535.

Milliken et al., "Low Cost, High Efficiency Reversible Fuel Cell Systems," Proceedings of the 2002 U.S. DOE Hydrogen Program Review, NREL/CP-610-32405.

K. Eguchi et al., Power Generation and Steam Electrolysis Characteristics of an Electrochemical Cell with a Zirconia or Ceria based Electrode, Solid State Ionics, 86 88, 1996, p. 1245-49.

F. Mitlitsky et al., "Regenerative Fuel Cells for High Altitude Long Endurance Solar Powered Aircraft," $28^{th}$ Intersociety Energy Conversion Engineering Conference (IECED), Jul. 28, 1993, UCRL-JC-113485.

Small, Ultra Efficient Fuel Cell Systems, Advanced Technology Program, ATP 2001 Competition, Jun. 2002.

F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.

Ralph et al., "Cathode Materials for Reduced-Temperature SOFCs," Journal of the Electrochemical Society, 2003, p. A1518-A1522, vol. 150.

Simmer et al., "Development of Fabrication Techniques and Electrodes for Solid Oxide Fuel Cells," Electrochemcial Society Proceedings, p. 1050-1061, vol. 2001-16.

Yamamoto et al., "Electrical Conductivity of Stabilized Zirconia with Ytterbia and Scandia," Solid State Ionics, v79, p. 137-142, Jul. 1995.

Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.

Lybye et al., "Effect of Transition Metal Ions on the Conductivity and Stability of Stabilized Zirconia," Ceramic Engineering and Science Proceedings, v27, n4, p. 67-78, 2006.

Anonymous, "Presentation of the LabView-based Software Used in Fuel Cell Technologies Testing System," http://web.archive.org/web/20040715025135/fuelcelltechnologies.com/Support/Downloads/Tutorial.pdf, Jul. 15, 2004.

Hamburger et al., "LabView DSC Automates Fuel Cell Catalyst Research," Nov. 4, 2004, http://web.archive.org/web/20041104200039/http://bloomy.com/newsletters/fuelcellresearch.pdf.

* cited by examiner

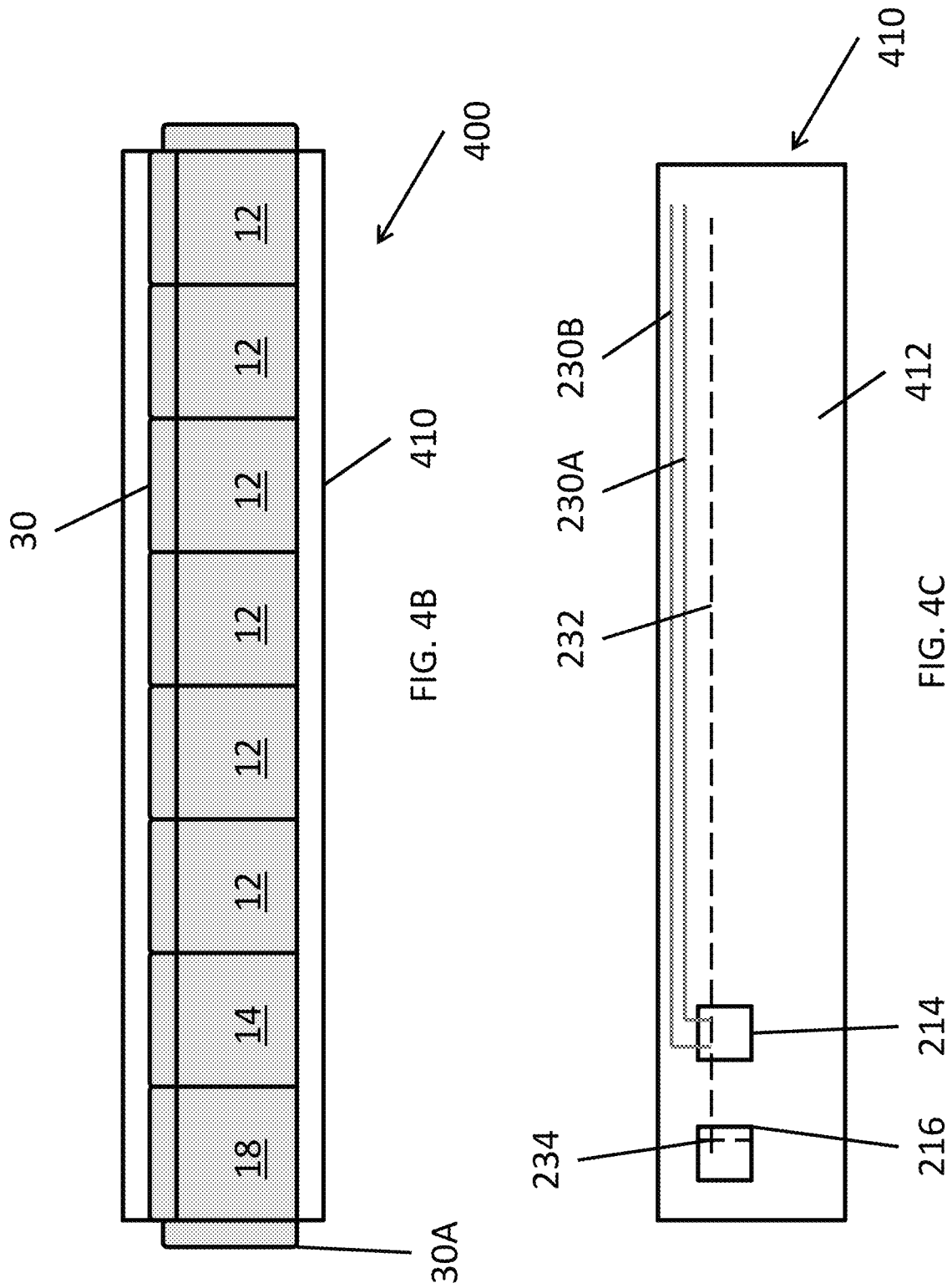

MODULAR PAD FOR A FUEL CELL SYSTEM

FIELD

The present invention is directed generally to fuel cell systems and specifically to mechanical components of the fuel cell systems.

BACKGROUND

Rapid and inexpensive installation can help to increase the prevalence of fuel cell systems. Installation costs for pour in place custom designed concrete pads, which generally require trenching for plumbing and electrical lines, can become prohibitive. Installation time is also a problem in the case of most sites since concrete pours and trenches generally require one or more building permits and building inspector reviews.

Furthermore, stationary fuel cell systems may be installed in location where the cost of real estate is quite high or the available space is limited (e.g., a loading dock, a narrow alley or space between buildings, etc.). The fuel cell system installation should have a high utilization of available space. When a considerable amount of stand-off space is required for access to the system via doors and the like, installation real estate costs increase significantly.

When the number of fuel cell systems to be installed on a site increases, one problem which generally arises is that stand-off space between these systems is required (to allow for maintenance of one unit or the other unit). The space between systems is lost in terms of its potential to be used by the customer of the fuel cell system.

In the case of some fuel cell system designs, these problems are resolved by increasing the overall capacity of the monolithic system design. However, this creates new challenges as the size and weight of the concrete pad required increases. Therefore, this strategy tends to increase the system installation time. Furthermore, as the minimum size of the system increases, the fault tolerance of the design is reduced.

The fuel cell stacks or columns of the fuel cell systems are usually located in hot boxes (i.e., thermally insulated containers). The hot boxes of existing large stationary fuel cell systems are housed in cabinets, housings or enclosures. The terms cabinet, enclosure, and housing are used interchangeably herein. The cabinets are usually made from metal. The metal is painted with either automotive or industrial powder coat paint, which is susceptible to scratching, denting and corrosion. Most of these cabinets are similar to current industrial HVAC equipment cabinets.

SUMMARY

Exemplary embodiments provide a modular fuel cell system, comprising: a base comprising a first through hole, a second through hole, and a generally U-shaped wire recess extending from the first through hole to the second through hole. Modules are disposed on the base in first and second parallel rows, the modules comprising: fuel cell power modules disposed in the first and second rows, a fuel processing module at a first end of the first row, and a power conditioning module disposed a first end of the second row. Wiring is disposed in the wiring recess and configured to connect the power modules to the power condition module. Each of the plurality of power modules comprises a separate cabinet comprising at least one fuel cell stack disposed in a hot box.

Exemplary embodiments provide a modular pad of a fuel cell system, comprising at least one pad section that comprises: bosses disposed in a first row, plumbing brackets disposed in a second row that is substantially parallel to the first row, a wiring recess extending between the plumbing brackets and the bosses, connection recesses extending from the wiring recess and between the bosses, and a plumbing recess extending along at least one edge of the pad section.

Exemplary embodiments provide a method of assembling a fuel cell system comprising: providing a plurality of identical precast concrete base sections comprising a plurality of bosses and channels, installing the base sections adjacent to each other in at least one of a linear configuration, a rectangular configuration, an orthogonal configuration, or a stepped configuration such that a channel of a first base section is aligned to a channel of an adjacent second base section to form a wiring channel, providing wiring into the wiring channel, installing fuel cell modules on the base section, and connecting the wiring to the fuel cell modules.

Exemplary embodiments provide a pad for a fuel cell system, comprising: a base having an upper surface, a separator disposed on the upper surface of the base, frames disposed on the separator and configured to support modules of the fuel cell system, and plumbing disposed between the upper surface of the base and the frames, and connected to the fuel cell modules. The separator is configured to space apart the frames and the upper surface of the base.

Exemplary embodiments provide a method of assembling a fuel cell system comprising: connecting frames to respective fuel cell modules, connecting at least one of wiring and plumbing in the frames to the respective fuel cell modules, transporting the connected frames and fuel cell modules to an installation location, and installing the frames over a concrete base at the installation location, such that the frames are located between the fuel cell modules and the concrete base.

BRIEF DESCRIPTION OF THE DRAWINGS

FIG. 4B illustrates top plan view of the system of FIG. 4A.

FIG. 4C illustrates a schematic view of a pad of the fuel cell system of FIG. 4A.

DETAILED DESCRIPTION

It is to be understood that both the foregoing general description and the following detailed description are exemplary and explanatory only, and are not restrictive of the invention as claimed.

Figure 1:
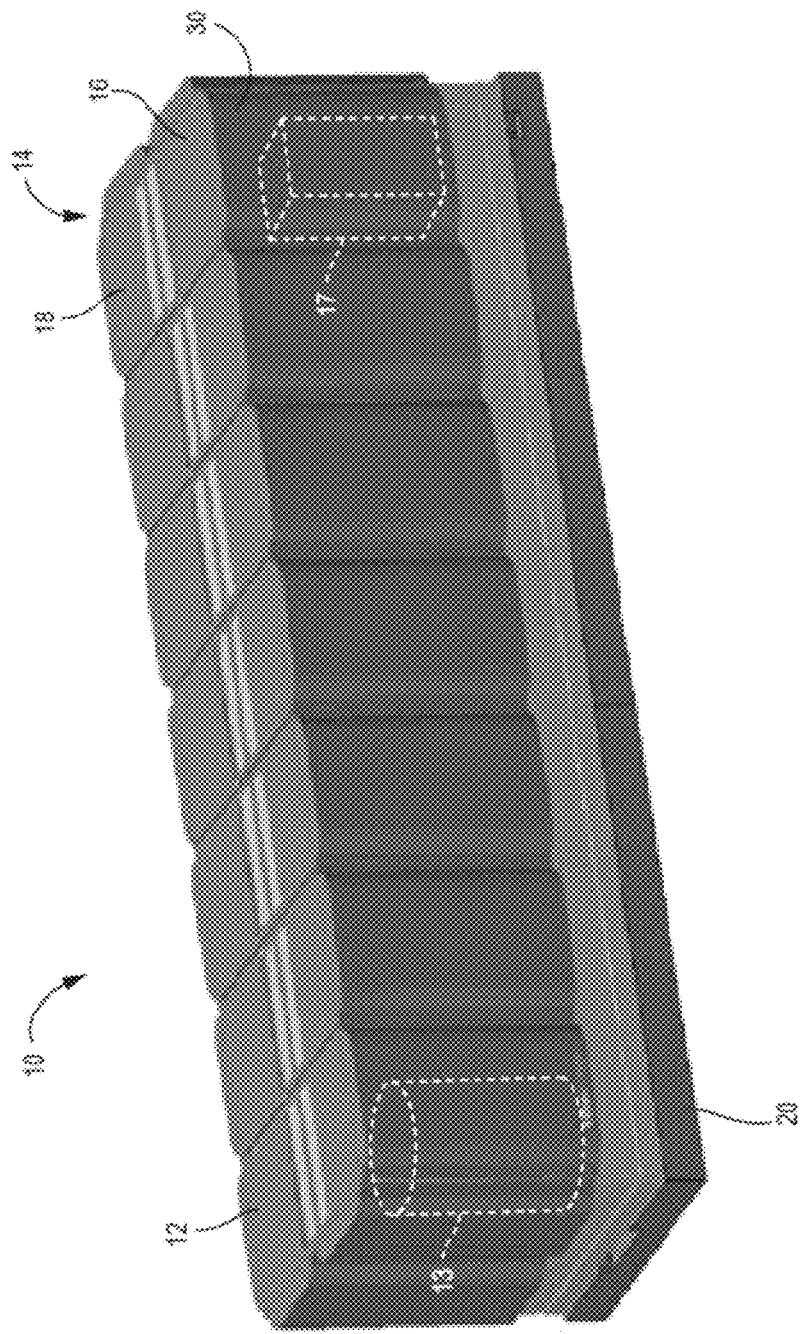
FIG. 1 is a perspective view of a modular fuel cell system according to various embodiments of the present disclosure.

Referring to FIG. 1, a modular fuel cell system 10 is shown according to an exemplary embodiment. The modular system 10 may contain modules and components described in U.S. patent application Ser. No. 11/656,006, filed on Jan. 22, 2007, and U.S. patent application Ser. No. 14/208,190, filed on Mar. 13, 2014, which are incorporated herein by reference in their entireties. The modular design of the fuel cell system 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The modular fuel cell system 10 includes a housing 14 in which at least one (preferably more than one or plurality) of power modules 12, one or more fuel processing modules 16, and one or more power conditioning (i.e., electrical output) modules 18 are disposed. In embodiments, the power conditioning modules 18 are configured to deliver direct current (DC). In alternative embodiments, the power conditioning modules 18 are configured to deliver alternating current (AC). In these embodiments, the power conditioning modules 18 include a mechanism to convert DC to AC, such as an inverter. For example, the system 10 may include any desired number of modules, such as 2-30 power modules, for example 3-12 power modules, such as 6-12 modules.

The system 10 of FIG. 1 includes six power modules 12 (one row of six modules stacked side to side), one fuel processing module 16, and one power conditioning module 18 on a pad 20. The housing 14 may include a cabinet to house each module 12, 16, 18. Alternatively, as will be described in more detail below, modules 16 and 18 may be disposed in a single cabinet. While one row of power modules 12 is shown, the system may comprise more than one row of modules 12. For example, the system 10 may comprise two rows of power modules 18 arranged back to back/end to end.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The modular fuel cell system 10 also contains at least one fuel processing module 16. The fuel processing module 16 includes components for pre-processing of fuel, such as adsorption beds (e.g., desulfurizer and/or other impurity adsorption) beds. The fuel processing module 16 may be designed to process a particular type of fuel. For example, the system may include a diesel fuel processing module, a natural gas fuel processing module, and an ethanol fuel processing module, which may be provided in the same or in separate cabinets. A different bed composition tailored for a particular fuel may be provided in each module. The processing module(s) 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, the fuel processing module 16 may include a reformer 17. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The power conditioning module 18 includes components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one cabinet of the housing 14. If a single input/output cabinet is provided, then modules 16 and 18 may be located vertically (e.g., power conditioning module 18 components above the fuel processing module 16 desulfurizer canisters/beds) or side by side in the cabinet.

As shown in one exemplary embodiment in FIG. 1, one cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in the preferred embodiment, the input/output module 14 is at the end of the row of power modules 12, it could also be located in the center of a row power modules 12.

The modular fuel cell system 10 may be configured in a way to ease servicing of the components of the system 10. All of the routinely or high serviced components (such as the consumable components) may be placed in a single module to reduce amount of time required for the service person. For example, a purge gas (optional) and desulfurizer material for a natural gas fueled system may be placed in a single module (e.g., a fuel processing module 16 or a combined input/output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the system 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell system 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel cell system 10 and/or serviced or repaired without stopping an operation of the other modules in the system, allowing the fuel cell system to continue to generate electricity. The entire fuel cell system 10 does not have to be shut down if one stack of fuel cells in one hot box 13 malfunctions or is taken off line for servicing.

Figure 2:
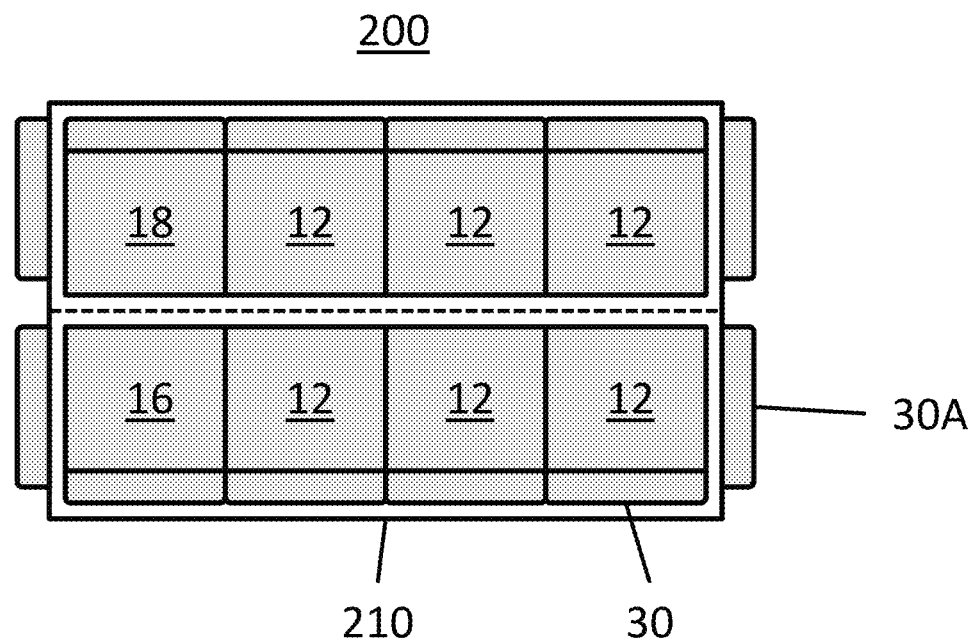
FIG. 2 illustrates top plan view of a modular fuel cell system according to various embodiments of the present disclosure.

FIG. 2 illustrates top plan view of a modular fuel cell system 200 according to various embodiments of the present disclosure. The fuel cell system 200 is similar to the fuel cell system 10 of FIG. 1. As such, similar reference numbers are used for similar elements, and only the differences therebetween will be described in detail.

Referring to FIG. 2, the system 200 includes power modules 12, a power conditioning module 18, and a fuel processing module 16 disposed on a pad 210. The system 200 may include doors 30 to access the modules 12, 16, 18. The system 200 may further include cosmetic doors 30A.

The power modules 12 may be disposed in a back-to-back configuration. In particular, the power modules 12 may be disposed in parallel rows, and the fuel processing module 16 and the power conditioning module may be disposed at ends of the rows. Accordingly, the system 200 has an overall rectangular configuration, and may be shorter in length than other systems, such as the system 10 of FIG. 1. As such, the system 200 can be disposed in locations where space length is an issue. For example, the system 200 may fit in a parking spot adjacent to a building to which power is to be provided.

While the system 200 is shown to include two rows of three power modules 12, the present disclosure is not limited to any particular number of power modules 12. For example, the system 200 may include 2-30 power modules 12, 4-12 power modules 12, or 6-12 power modules 12, in some embodiments. In other words, the system 200 may include any desired number of power modules 12, with the power modules 12 being disposed in a back-to-back configuration. In addition, the positions of the fuel processing module 16 and the power conditioning module 18 may be reversed, and/or the modules 16, 18 may be disposed on either end of the system 200.

Figure 3A:
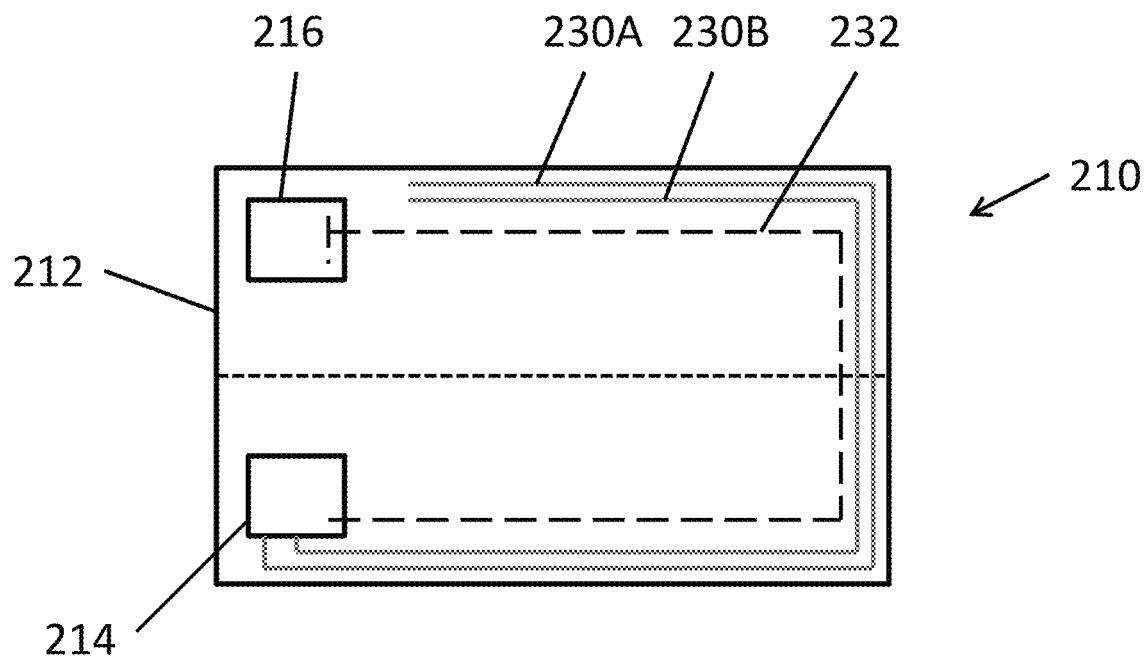
FIGS. 3A, 3B, and 3C illustrate top and perspective views of a pad of the fuel cell system of FIG. 2.
Figure 3B:
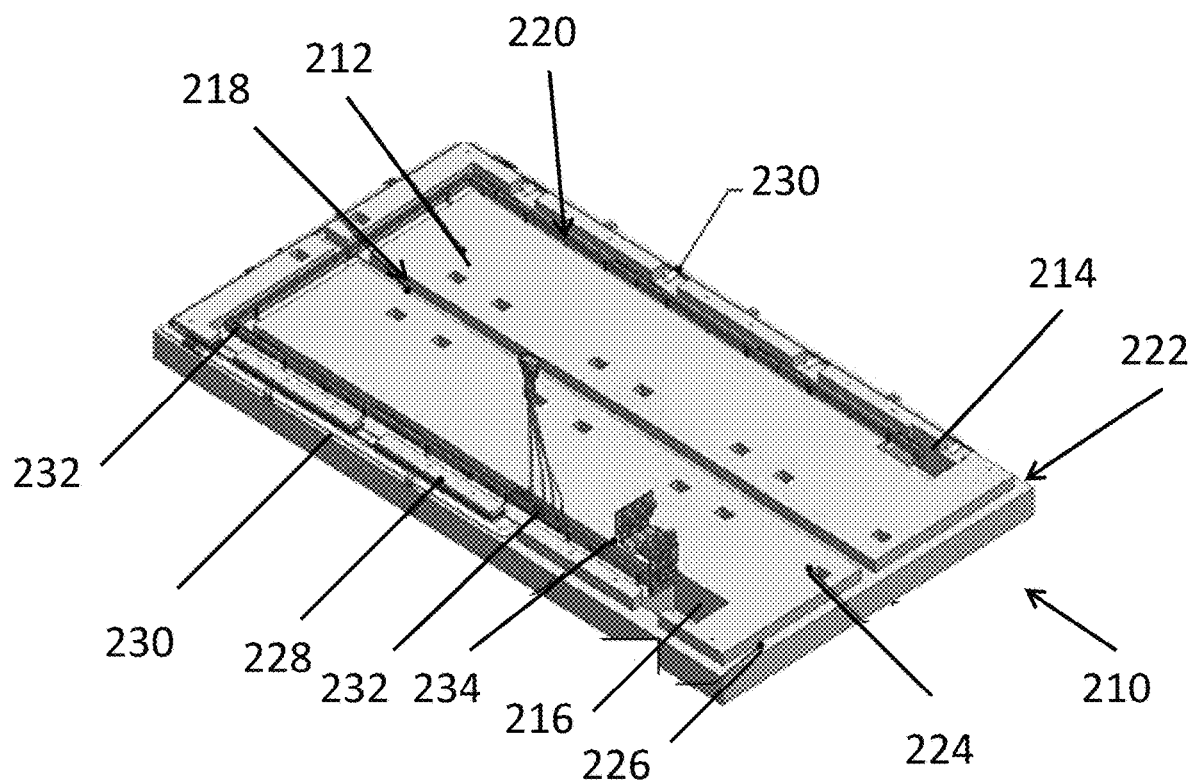

FIG. 3A illustrates a schematic top view of the pad 210. FIG. 3B illustrates a perspective view of the pad 210, and FIG. 3C illustrates a perspective view of the pad 210 including an edge cover.

Figure 3C:
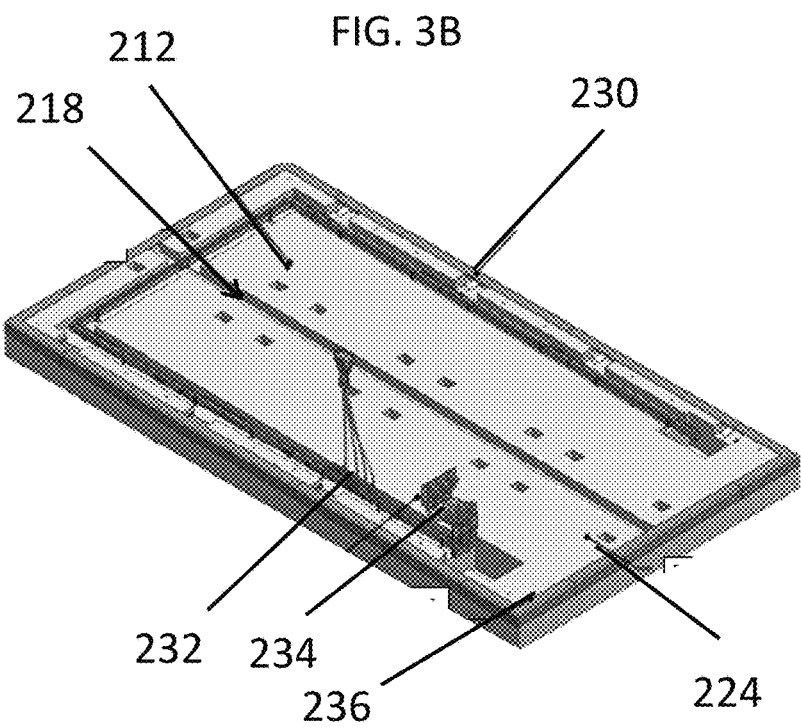

Referring to FIGS. 3A-3C, the pad 210 includes a base 212. The base 212 may be formed of a concrete or similar material. Alternatively, the base 212 may be made of any other suitable structural material, such as steel or another metal, and may be pre-cast as a single body or may be cast in sections. The base 212 may be made by casting the base material in a patterned mold, removing the cast base 212 from the mold, and then transporting the base 212 from the location of the mold (e.g., in a base fabrication facility) to the operation site of the fuel cell system (i.e., where the fuel cell system will be located to generate power). The base 212 may be configured as a single piece, or may include multiple connected sections.

The base 212 may include first and second through holes 214, 216, a drainage recess 218, a wiring recess 220, and a plumbing recess 222. The base 212 may also include tie-down pockets 224, tie-down inserts 226, and pluming brackets 228.

The drainage recess 218 may extend along the middle of the base 212, between the rows of modules, and may be configured to collect, for example, rain or debris collected on the base 212. The tie-down pockets 224 and tie-down inserts 226 may be configured to secure corresponding modules to the base 212. The plumbing recess 222 may extend around the perimeter of the base 212. In particular, the plumbing recess 222 may be formed along three or more edges of the base 212. The wiring recess 220 may extend from the first through hole 214 to the second through hole 216, and may be generally U-shaped.

The pad 210 may also include plumbing 230, wiring 232, and a system electrical connection, such as a bus bar 234. In particular, the wiring 232 may be disposed in the wiring recess 220 and may be connected to one or more of the modules. For example, the wiring 232 may be connected to the bus bar 234 and each of the power modules 12. The bus bar 234 may be connected to the power conditioning module 18. The power conditioning module 18 may be connected to an external load through the second through hole 216. The bus bar 234 may be disposed on an edge of the through hole 216, such that the wiring 232 does not extend across the through hole 216. However, the bus bar 234 may be disposed on an opposing side of the through hole 216, such that the wiring 232 does extend across the through hole 216, if such a location is needed to satisfy system requirements.

The plumbing 230 may be disposed in the plumbing recess 222. The plumbing 230 may be connected to an external source of water and/or fuel, via the first through hole 214, and may be attached to the plumbing brackets 228. In particular, the plumbing 230 may include a fuel pipe 230A connecting the fuel processing module 16 to the power modules 12. The plumbing 230 may also include a water pipe 230B configured to provide water to the power modules 12. The plumbing 230 may extend between the plumbing brackets 228 to the power modules 12.

As shown in FIG. 3C, the plumbing 230 may be covered by an edge cover 236. In particular, the edge cover 236 may be configured to cover the plumbing recess 222. In some embodiments, the edge cover 236 may include a number of segments, such that the edge cover 236 may be removed and/or installed on a piece-by-piece basis.

Figure 3D:
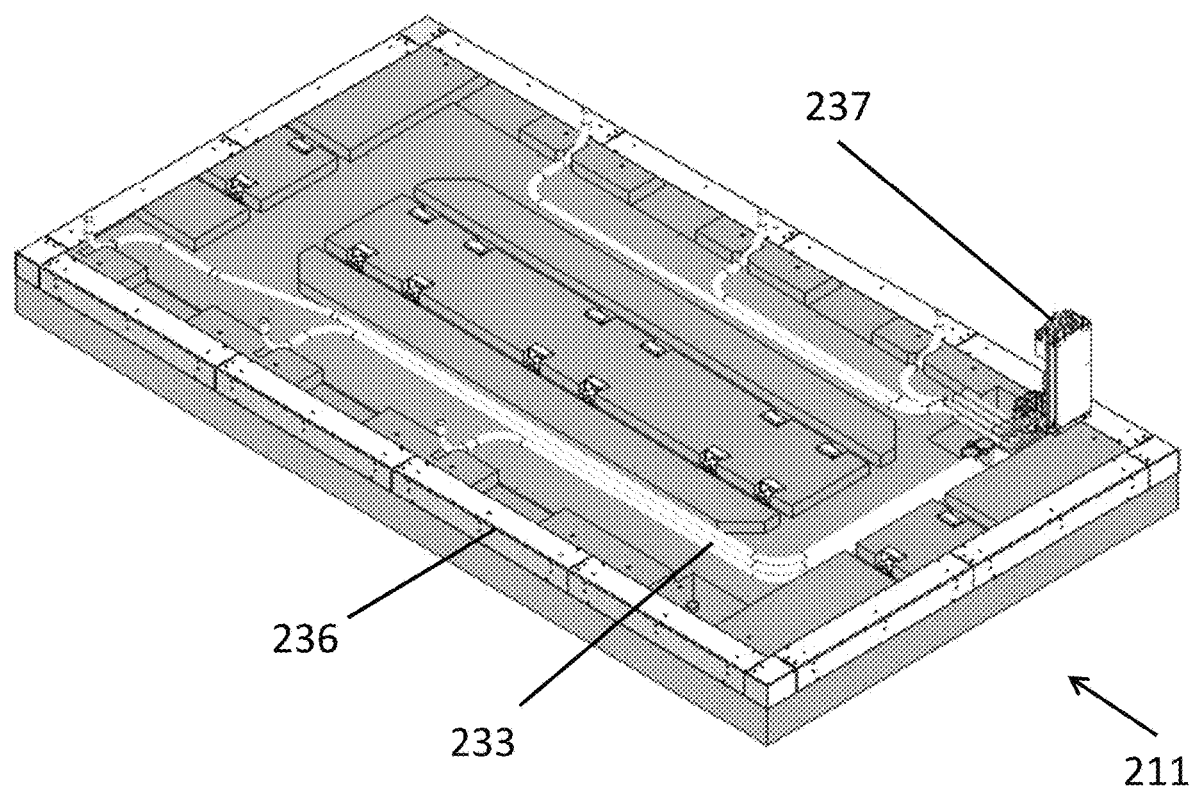
FIG. 3D illustrates a perspective view of a modified version of a pad of the fuel cell system of FIG. 2.

FIG. 3D illustrates a perspective view of a pad 211, according to various embodiments of the present disclosure. The pad 211 is an alternate version of the pad 210 of the fuel cell system of FIG. 2, in place of the pad 210. Accordingly, only the differences between the pads 210, 211 will be described in detail.

Referring to FIG. 3D, the pad 211 includes wiring 233, but does not include a bus bar. In particular, the wiring 233 may be in the form of cables configured to attach each power module 12 to the power conditioning module 18 and the system electrical connection may comprise a cable assembly input or output 237.

Figure 4A:
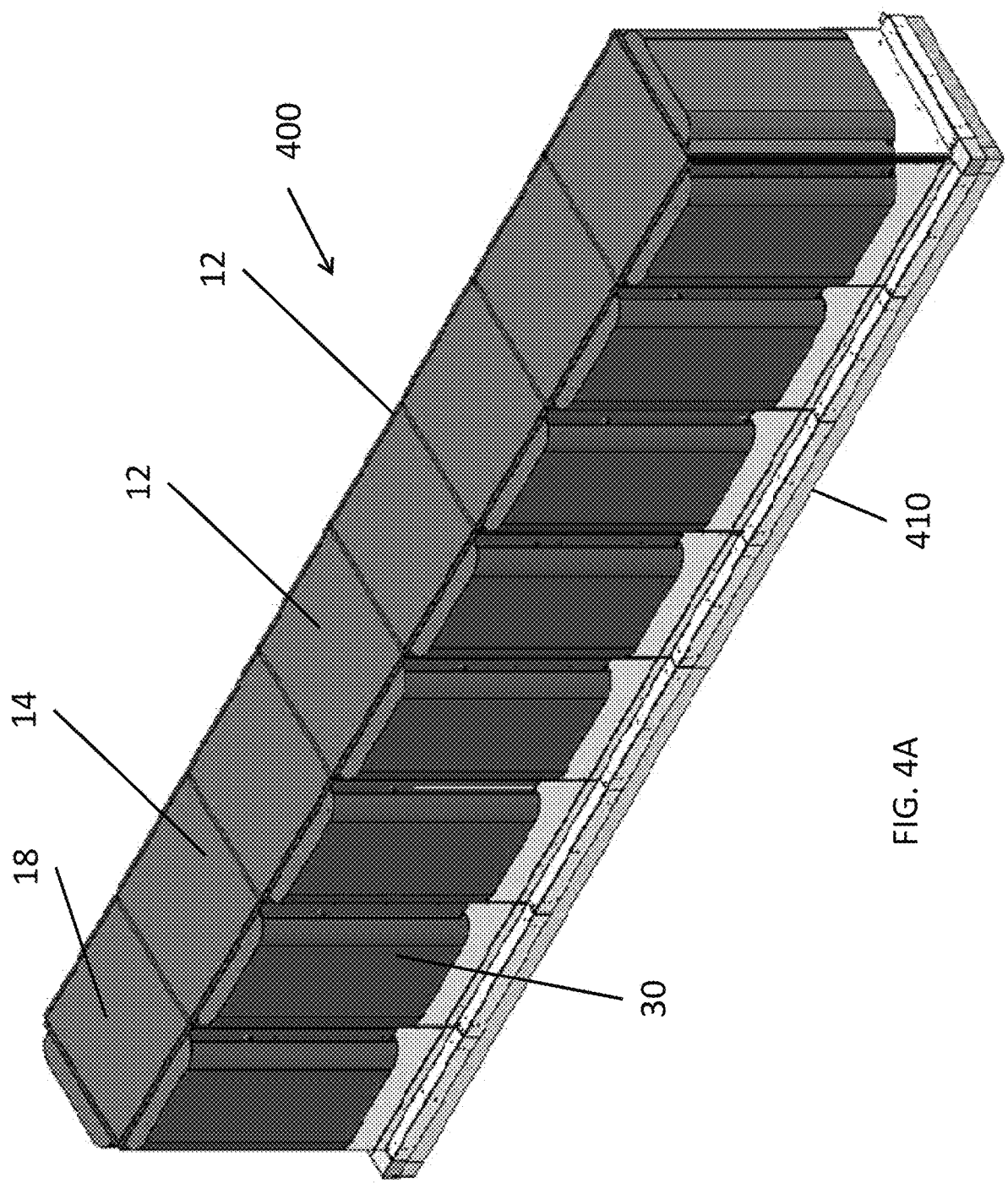
FIG. 4A illustrates a perspective view of a modular fuel cell system according to various embodiments of the present disclosure.

FIG. 4A illustrates a perspective view of a modular fuel cell system according to various embodiments of the present disclosure. FIG. 4B illustrates top plan view of the system 400. FIG. 4C illustrates a schematic view of a pad 410 of FIG. 4A. The fuel cell system 400 includes similar components to the fuel cell system 10 of FIG. 1. As such, similar reference numbers are used for similar elements, and only the differences therebetween will be described in detail.

Referring to FIGS. 4A-C, the system 400 includes power modules 12, a power conditioning module 18, and a fuel processing module 16 disposed on a pad 410. The system 400 may include doors 30 to access the modules 12, 16, 18. The system 400 may further include cosmetic doors 30A.

The power modules 12 may be disposed in a linear configuration. In particular, the power modules 12 may be disposed in one row, and the fuel processing module 16 and the power conditioning module 18 may be disposed at an end of the row. According to some embodiments, the fuel processing module 16 and the power conditioning module 18 may be disposed in the middle of the row. Accordingly, the system 400 has an overall linear configuration, and may be fit into locations having linear space, but limited width. An example of such a location may be behind a big box store.

While the system 400 is shown to include a row of six power modules 12, the present disclosure is not limited to any particular number of power modules 12. For example, the system 400 may include 2-30 power modules 12, 4-12 power modules 12, or 6-12 power modules 12, in some embodiments. In other words, the system 500 may include any desired number of power modules 12, with the modules 12, 14, 18 being disposed in a linear configuration.

The pad 410 includes a base 412. The base 412 may include first and second through holes 214, 216. The base 412 may also include a wiring recess and a plumbing recess, as discussed below with regard to FIG. 10. The base 412 may be formed of a concrete or similar material. Alternatively, the base 412 may be made of any other suitable structural material, such as steel or another metal, and may be pre-cast as a single body or may be cast in sections. The base 412 may be made by casting the base material into a patterned mold, removing the cast base 412 from the mold and then transporting the base 412 from the location of the mold (e.g., in a base fabrication facility) to the location of the fuel cell system (i.e., where the fuel cell system will be located to generate power).

The pad 410 may also include plumbing 230 (for example, water pipe 230A and fuel pipe 230B), wiring 232, and a system bus bar 234. In particular, the wiring 232 may be disposed in a substantially linear wiring recess and may be connected to one or more of the modules. For example, the wiring 232 may be connected to the bus bar 234 and each of the power modules 12. The bus bar 234 may be connected to the power conditioning module 18. The power conditioning module 18 may be connected to an external load through the second through hole 216. The bus bar 234 may be disposed on an edge of the second through hole 216, such that the wiring 232 does not extend across the second through hole 216. However, the bus bar 234 may be disposed on an opposing side of the second through hole 216, such that the wiring 232 does extend across the second through hole 216, if such a location is needed to satisfy system requirements.

According to some embodiments, the plumbing 230 and the wiring 232 may be disposed adjacent to the doors 30, in order to facilitate connecting the same to the modules 12, 16, 18. In other words, the plumbing 230 and the wiring 232 may be disposed adjacent to an edge of the base 412. According to some embodiments, the wiring 232 may be in the form of cables, similar to what is shown in FIG. 3D, and the bus bar 234 may be omitted.

Figure 5A:
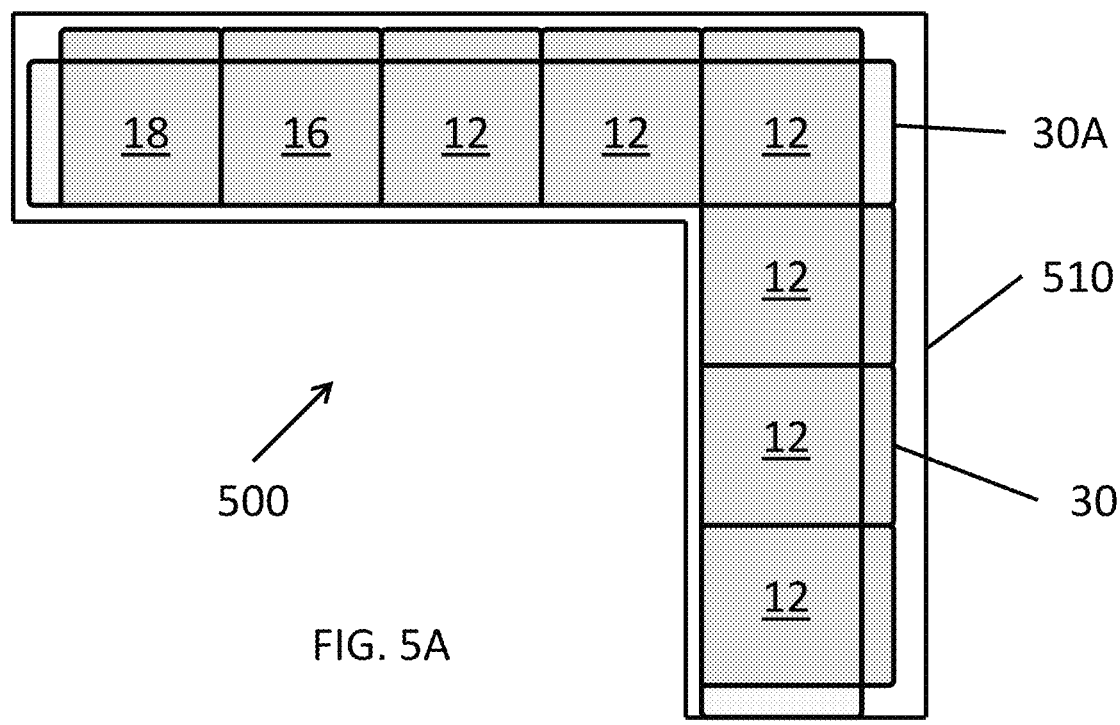
FIG. 5A illustrates a top plan view of a modular fuel cell system according to various embodiments of the present disclosure.
Figure 5B:
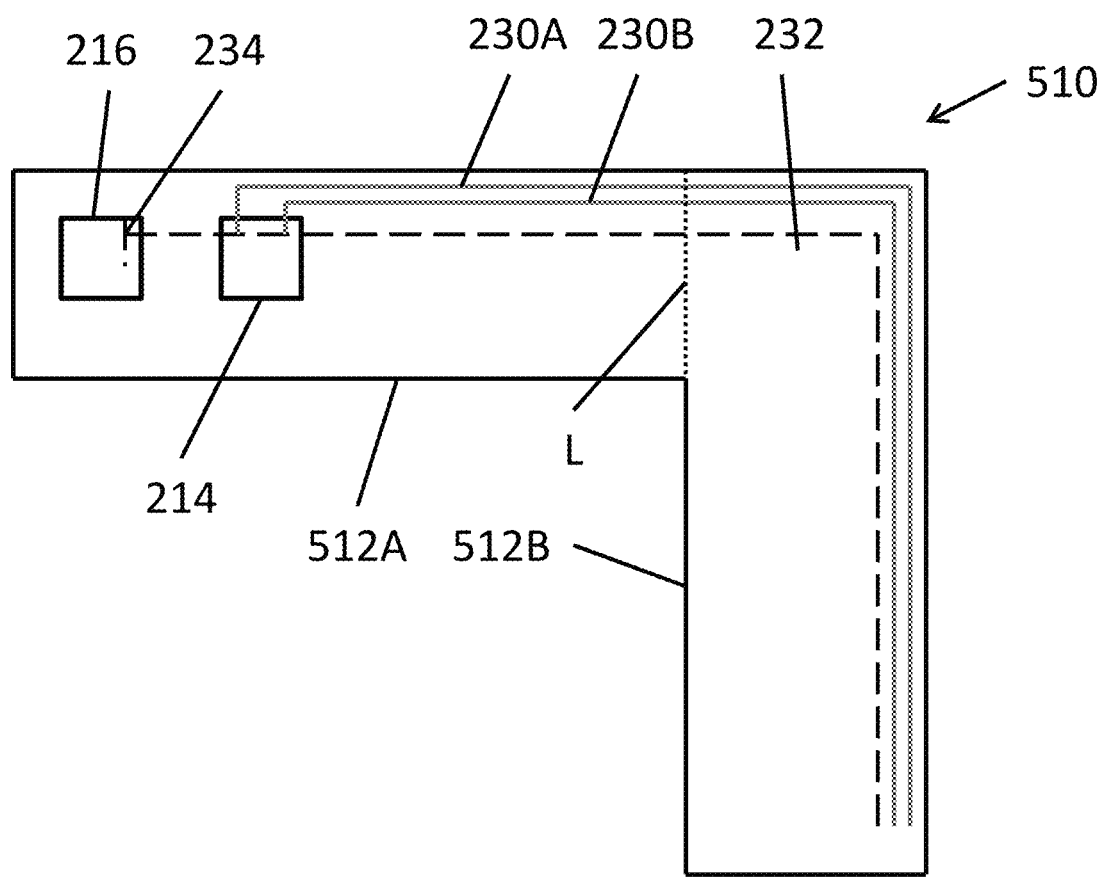
FIG. 5B illustrates a schematic view of a pad of the fuel cell system of FIG. 5A.

FIG. 5A illustrates a top plan view of a modular fuel cell system 500 according to various embodiments of the present disclosure. FIG. 5B illustrates a schematic view of a pad 510 of FIG. 5A. The fuel cell system 500 includes similar components to the fuel cell system 200. As such, similar reference numbers are used for similar elements, and only the differences therebetween will be described in detail.

Referring to FIGS. 5A and 5B, the system 500 includes power modules 12, a power conditioning module 18, and a fuel processing module 16, which are disposed on a pad 510. The system 500 may include doors 30 to access the modules 12, 16, 18. The system 500 may further include cosmetic doors 30A.

The power modules 12 may be disposed in an L-shaped configuration. In particular, the power modules 12 may be disposed in a first row, and the fuel processing module 16, the power conditioning module 18, and addition power modules 12 may be disposed in a second row substantially orthogonal to the first row. In particular, the modules 16, 18 may be disposed at a distal end of the second row. Accordingly, the system 500 may be configured to operate in locations having linear space, but limited width. An example of such a location may be behind a large store.

While the system 500 is shown to include a row of six power modules 12, the present disclosure is not limited to any particular number of power modules 12. For example, the system 500 may include 2-30 power modules 12, 4-12 power modules 12, or 6-12 power modules 12, in some embodiments. In other words, the system 500 may include any desired number of power modules 12, with the modules 12, 14, 18 being disposed in an orthogonal configuration.

The pad 510 includes a base 512. The base 512 may include first and second through holes 214, 216, a wiring recess, and a plumbing recess. The base 512 may be formed of a concrete or similar material. The base 512 may be pre-cast as a single body or may be cast in sections. For example, the base 512 may include a first section 512A and a second section 512B, which may be precast and then disposed adjacent to one another at an operating location. The division between the sections 512A and 512B is shown by dotted line L. The first row of modules may be disposed on the first section 512A, and the second row of modules may be disposed on the second section 512B.

The pad 510 may also include plumbing 230 (for example, water plumbing 230A and fuel plumbing 230B), wiring 232, and a system bus bar 234. In particular, the wiring 232 may be disposed in a wiring recess and may be connected to one or more of the modules. For example, the wiring 232 may be connected to the bus bar 234 and each of the power modules 12. The bus bar 234 may be connected to the power conditioning module 18. The power conditioning module 18 may be connected to an external load through the second through hole 216.

According to some embodiments, the plumbing 230 and the wiring 232 may be disposed adjacent to the doors 30, in order to facilitate connecting the same to the modules 12, 16, 18. In other words, the plumbing 230 and the wiring 232 may be disposed adjacent to edges of the base 512. According to some embodiments, the wiring 232 may be in the form of cables, similar to what is shown in FIG. 3D, and the bus bar 234 may be omitted.

Figure 5C:
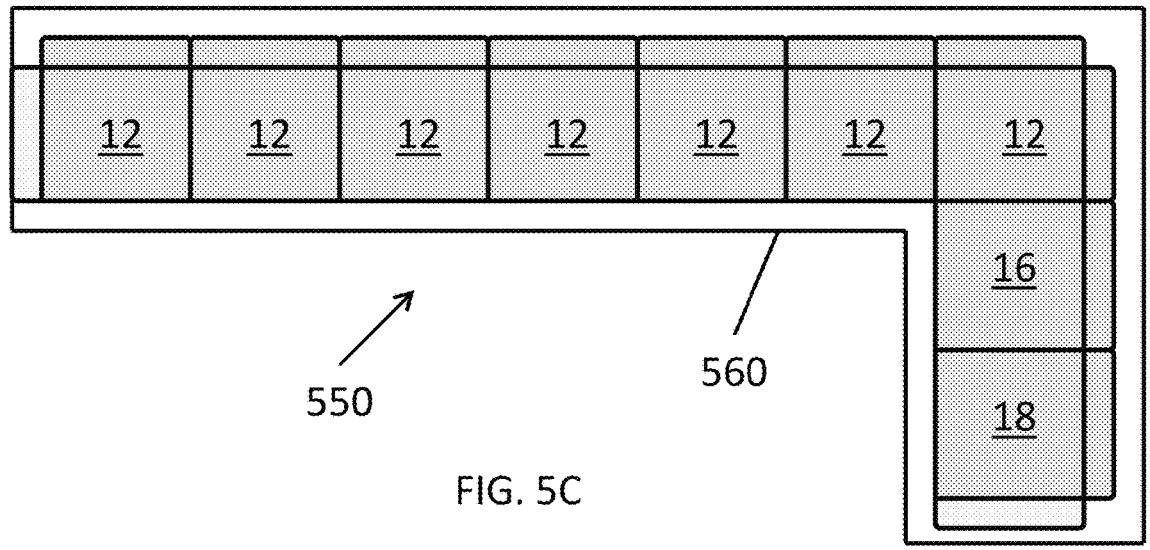
FIG. 5C illustrates a top plan view of a modular fuel cell system according to various embodiments of the present disclosure.
Figure 5D:
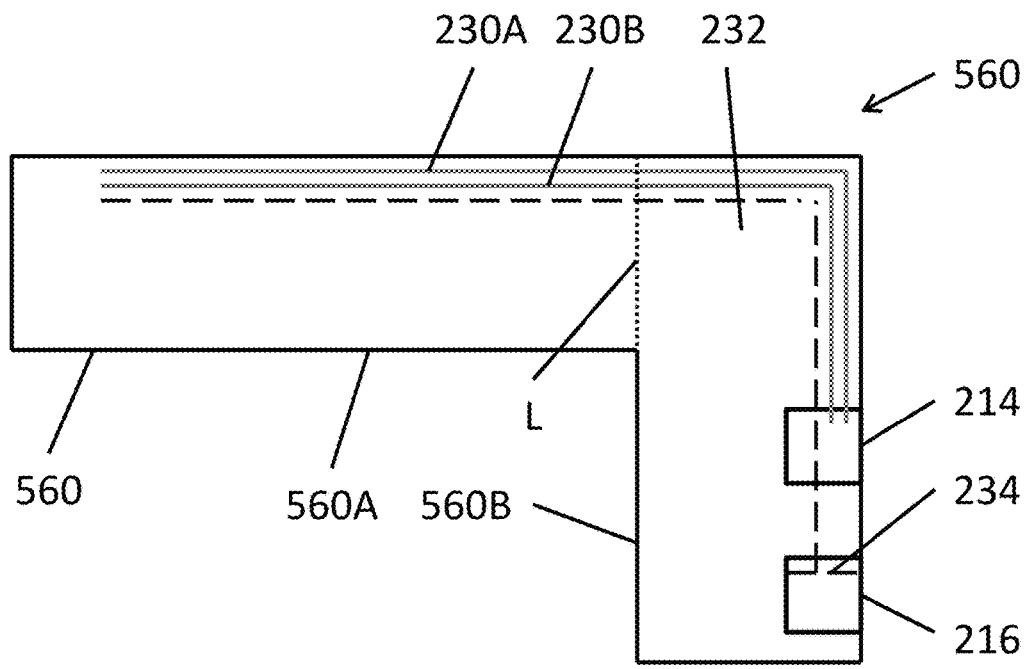
FIG. 5D illustrates a schematic view of a pad of the fuel cell system FIG. 5C.

FIG. 5C illustrates a top plan view of a modular fuel cell system 550 according to various embodiments of the present disclosure. FIG. 5D illustrates a schematic view of a pad 560 of FIG. 5C. The fuel cell system 550 includes similar components to the fuel cell system 500. As such, similar reference numbers are used for similar elements, and only the differences therebetween will be described in detail.

Referring to FIGS. 5C and 5D, the system 550 includes power modules 12, a power conditioning module 18, and a fuel processing module 16, which are disposed on a pad 560. The power modules 12 may be disposed in a first row, and fuel processing module 16 and the power conditioning module 18 may be disposed in a second row that is generally orthogonal to the first row. As such, the system 550 may be generally L-shaped. The pad 560 may include first and second sections 560A and 560B separated by dotted line L. However, the pad 560 may be formed of a single piece of material. The first row of modules may be disposed on the first section 560A, and the second row of modules may be disposed on the second section 560B.

The pad 560 may also include plumbing 230 (for example, water plumbing 230A and fuel plumbing 230B), wiring 232, a first through hole 214, a second through hole 216, and a system bus bar 234. In particular, the wiring 232 may be disposed in a wiring recess and may be connected to one or more of the modules. For example, the wiring 232 may be connected to the bus bar 234 and each of the power modules 12. The bus bar 234 may be connected to the power conditioning module 18. The power conditioning module 18 may be connected to an external load through the second through hole 216.

According to some embodiments, the plumbing 230 and the wiring 232 may be disposed adjacent to the doors 30, in order to facilitate connecting the same to the modules 12, 16, 18. In other words, the plumbing 230 and the wiring 232 may be disposed adjacent to edges of the pad 560. According to some embodiments, the wiring 232 may be in the form of cables, similar to what is shown in FIG. 3D, and the bus bar 234 may be omitted.

Figure 6A:
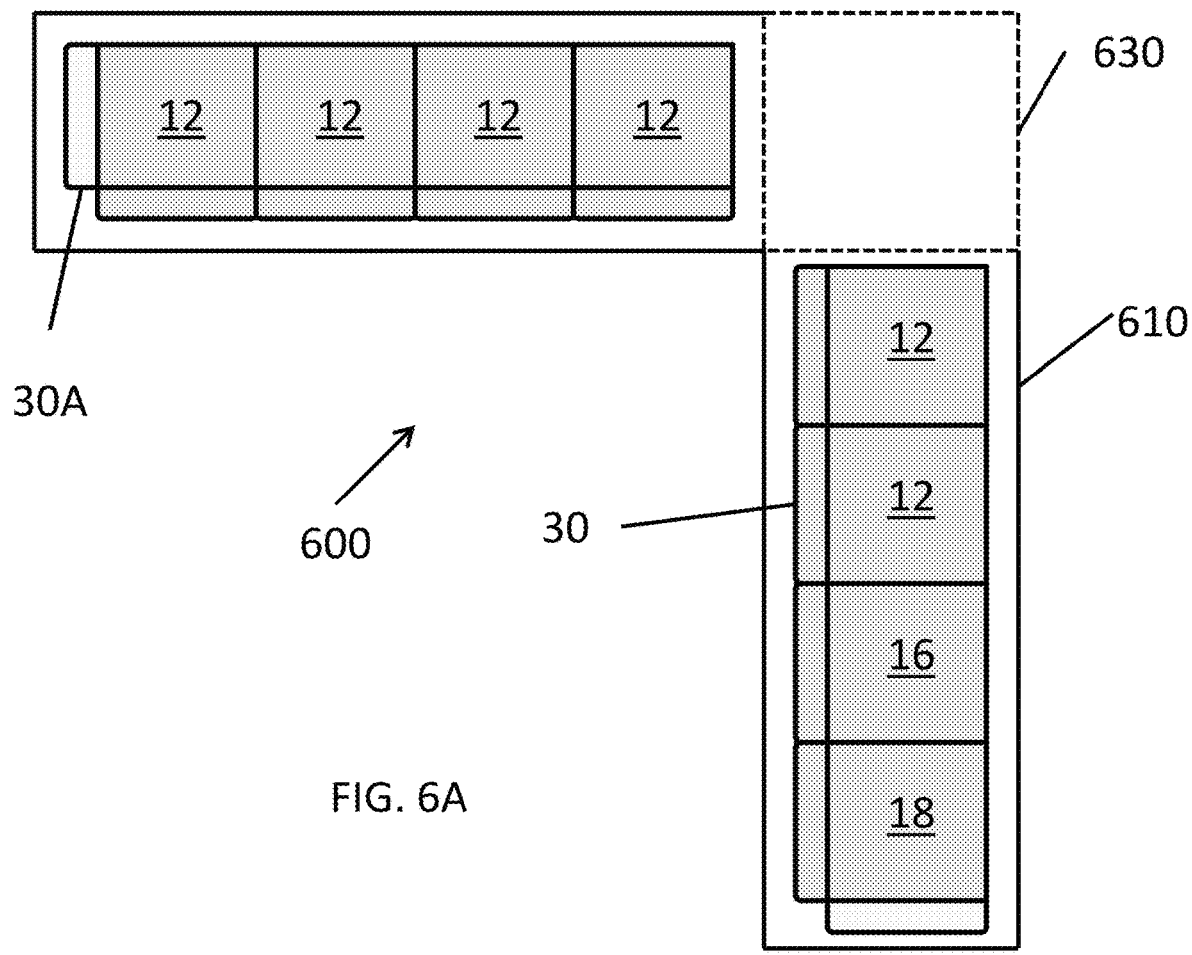
FIG. 6A illustrates a top plan view of a modular fuel cell system according to various embodiments of the present disclosure.
Figure 6B:
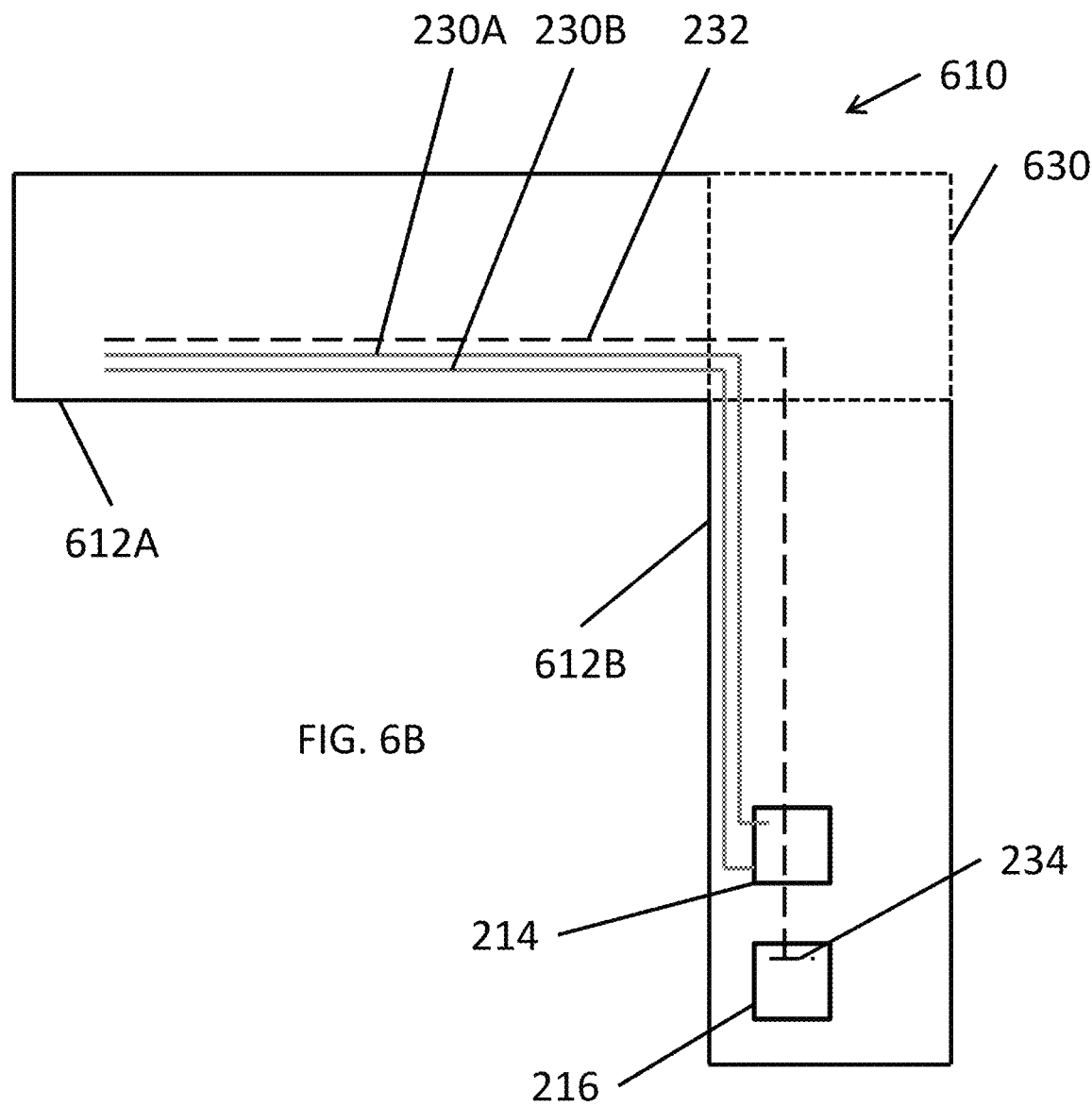
FIG. 6B illustrates a schematic view of a pad of the fuel cell system of FIG. 6A.

FIG. 6A illustrates a top plan view of a modular fuel cell system 600 according to various embodiments of the present disclosure. FIG. 6B illustrates a schematic view of a pad 610 of FIG. 6A. The fuel cell system 600 includes similar components to the fuel cell system 500. As such, similar reference numbers are used for similar elements, and only the differences therebetween will be described in detail.

Referring to FIGS. 6A and 6B, the system 600 includes power modules 12, a power conditioning module 18, and a fuel processing module 16, which are disposed on a pad 610. The system 600 may include doors 30 to access the modules 12, 16, 18. The system 600 may further include cosmetic doors 30A.

The power modules 12 may be disposed in an L-shaped configuration. In particular, the power modules 12 may be disposed in a first row, and the fuel processing module 16, the power conditioning module 18, and addition power modules 12 may be disposed in a second row substantially orthogonal to the first row. In particular, the modules 16, 18 may be disposed at a distal end of the second row.

In contrast to the system 500, the system 600 includes a dummy section 630 disposed between the first and second rows. The dummy section 630 may be a portion of the pad 610 that does not include a module. Plumbing 230 and wiring 232 may be routed through the dummy section 630 and may extend along an edge of the pad 610.

The pad 610 may include a first section 612A and a second section 612B, which are separated by the dummy section 630. In some embodiments, the dummy section 630 may be a separate section of the pad 610, or may be a portion of either of the first and second sections 612A, 612B. In some embodiments, an empty cabinet may be disposed on the dummy section 630. The first row of modules may be disposed on the first section 612A, and the second row of modules may be disposed on the second section 612B.

Figure 7A:
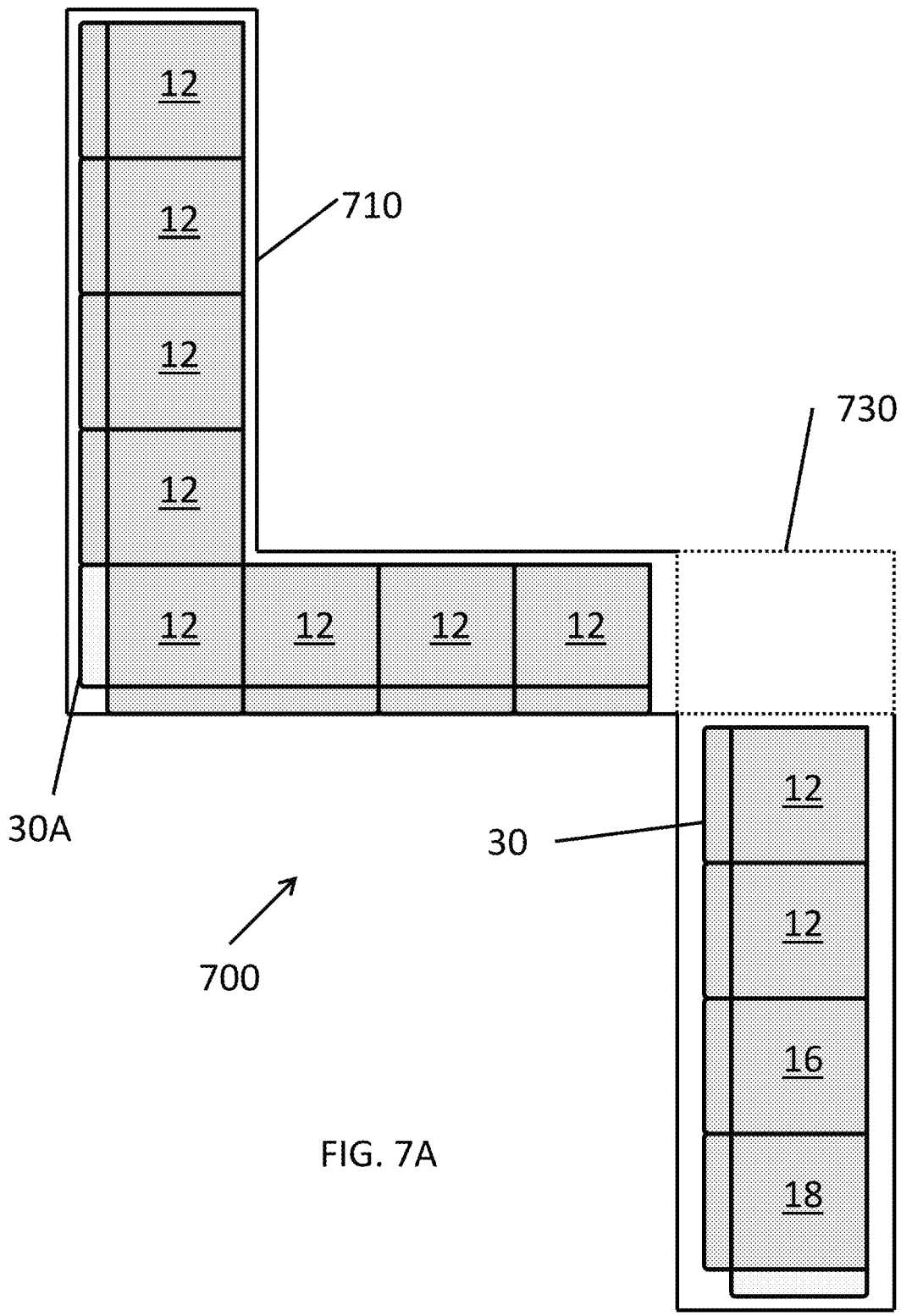
FIG. 7A illustrates a top plan view of a modular fuel cell system according to various embodiments of the present disclosure.
Figure 7B:
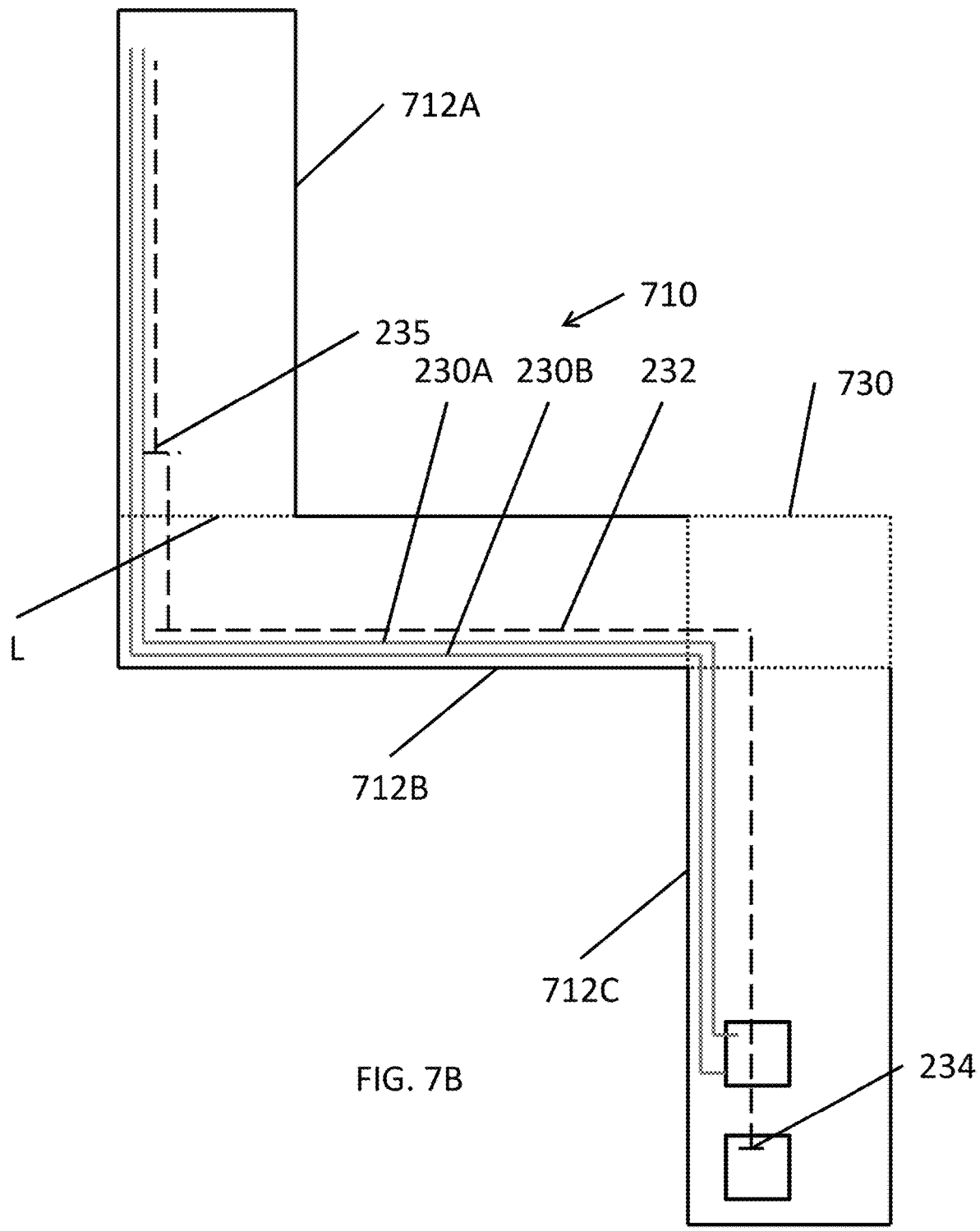
FIG. 7B illustrates a schematic view of a pad of the fuel cell system of FIG. 7A.

FIG. 7A illustrates a top plan view of a modular fuel cell system 700 according to various embodiments of the present disclosure. FIG. 7B illustrates a schematic view of a pad 710 of FIG. 7A. The fuel cell system 700 includes similar components to the fuel cell system 500. As such, similar reference numbers are used for similar elements, and only the differences therebetween will be described in detail.

Referring to FIGS. 7A and 7B, the system 700 includes power modules 12, a power conditioning module 18, and a fuel processing module 16, which are disposed on a pad 710. The system 700 may include doors 30 to access the modules 12, 16, 18. The system 700 may further include cosmetic doors 30A.

The power modules 12 may be disposed in a stepped configuration. In particular, the power modules 12 may be disposed in a first row, a second row substantially orthogonal to the first row, and a third row substantially orthogonal to the second row. The fuel processing module 16 and the power conditioning module 18 may be disposed at a distal end of the third row. However, the fuel processing module 16 and the power conditioning module 18 may be disposed in the first row or the second row, according to some embodiments.

The system 700 includes a dummy section 730 between the first and second rows. The dummy section 730 may be a portion of the pad 710 that does not include a module. In some embodiments, an empty cabinet may be disposed on the dummy section 730. Plumbing 230 and wiring 232 may be routed through the dummy section 730 and may extend along an edge of the pad 710.

The pad 710 may include a first section 712A, a second section 712B, and a third section 712C. The first and second sections 712A, 712B may be separated by line L. The second and third sections 712B, 712C may be separated by the dummy section 730. In some embodiments, the dummy section 730 may be a separate segment of the pad 710, or may be a portion of either of the second and third sections 712B, 712C. The first row of modules may be disposed on the first section 712A, the second row of modules may be disposed on the second section 712B, and the third row of modules may be disposed on the third section 712B. The pad 710 may also include a second system bus bar 235 configured to connect wiring 232 of the first and second sections 712A, 712B.

Figure 8:
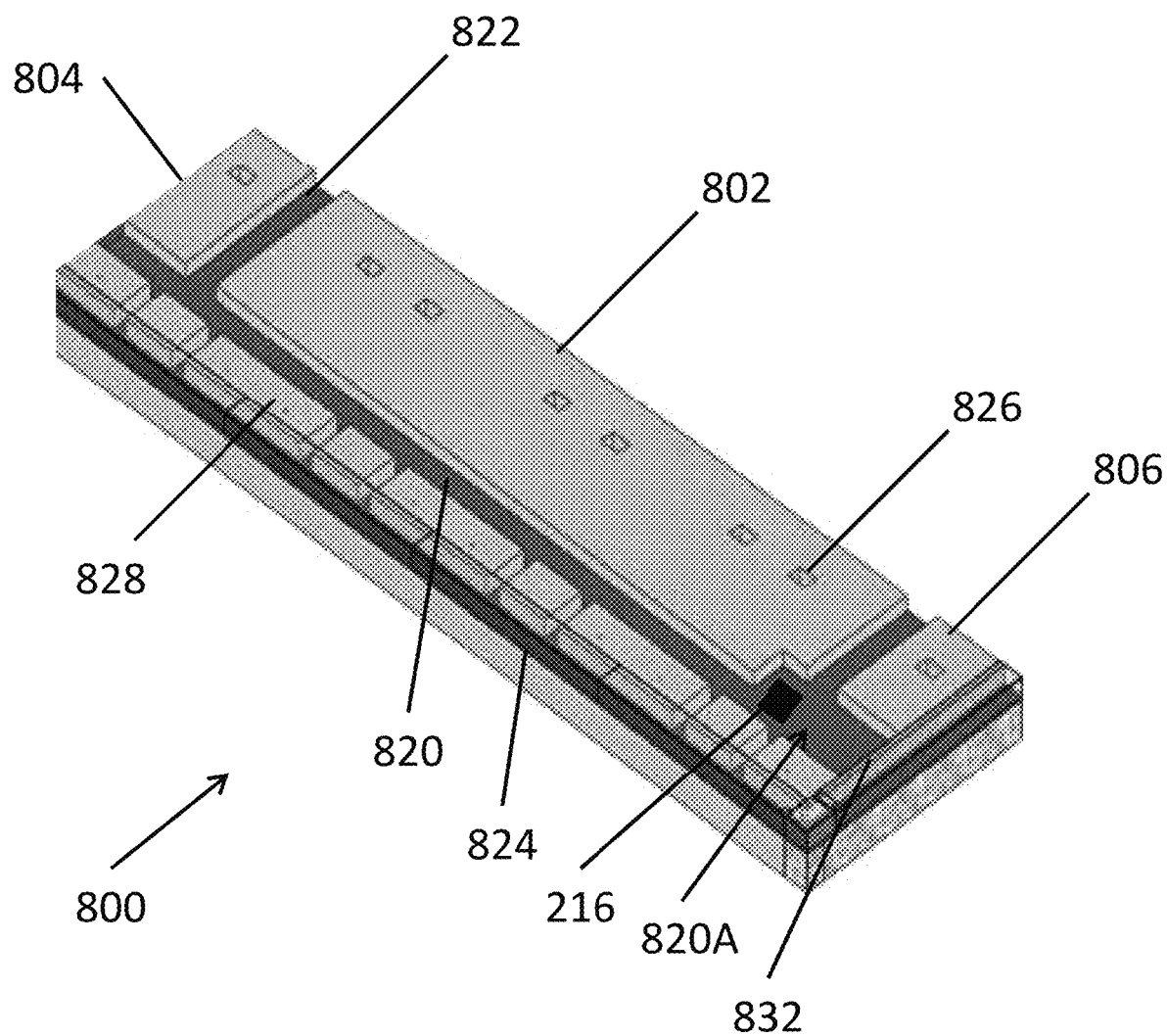
FIG. 8 illustrates a perspective view of modular pad section according to various embodiments of the present disclosure.

FIG. 8 illustrates a perspective view of modular pad section 800 according to various embodiments of the present disclosure. Referring to FIG. 8, the pad section 800 may be used as any of the sections of the above-described pads. The pad section 800 may be rectangular, e.g., the pad section 800 may have two substantially parallel long sides and two substantially parallel short sides extending therebtween.

The pad section 800 may include a first boss 802, a second boss 804, a third boss 806, plumbing brackets 828, a wiring recess 820, connection recesses 822, and a plumbing recess 824, which may be formed on an upper surface of the pad section 800. The first boss 802 may be disposed between the second and third bosses 804, 806. The second boss 804 may have a larger surface area than the third boss 806. For example, the second boss 804 and the third boss 806 may have substantially the same width, but the second boss 804 may be longer than the third boss 806. The first boss 802 may have a larger surface area than the second or third bosses 804, 806. A portion 820A of the wiring recess 820 that is disposed between the third boss 806 and adjacent plumbing brackets 828 may be enlarged, e.g., the enlarged portion 820A may be wider than the rest of the wiring recess 820. A through hole 216 may be formed in the enlarged portion 820A, according to some embodiments.

The wiring recess 820 may be disposed between the bosses 802, 804, 806 and the plumbing brackets 828. The bosses 802, 804, 806 may include tie-down pockets 826, configured to secure modules disposed thereon. The plumbing brackets 828 may be disposed in a first row, and the bosses 802, 804, 806 may be disposed in a second row that is substantially parallel to the first row.

The plumbing recess 824 may be formed on only two or three sides/edges of the pad section 800, depending on the shape of a pad constructed using the pad sections. For example, the plumbing recess 824 may extend along a long side and one short side of the pad section 800, if the pad section 800 is to be used in a fuel cell system having L-shaped or linear configuration. In the alternative, the plumbing recess 824 a long side and two short sides of the pad section 800, if the pad section 800 is to be used in a fuel cell system having a rectangular configuration.

An edge cover 832 may be disposed on the plumbing recesses 822. The pad section 800 may be precast, delivered, and then assembled on site with one or more other pad sections 800.

Figure 9A:
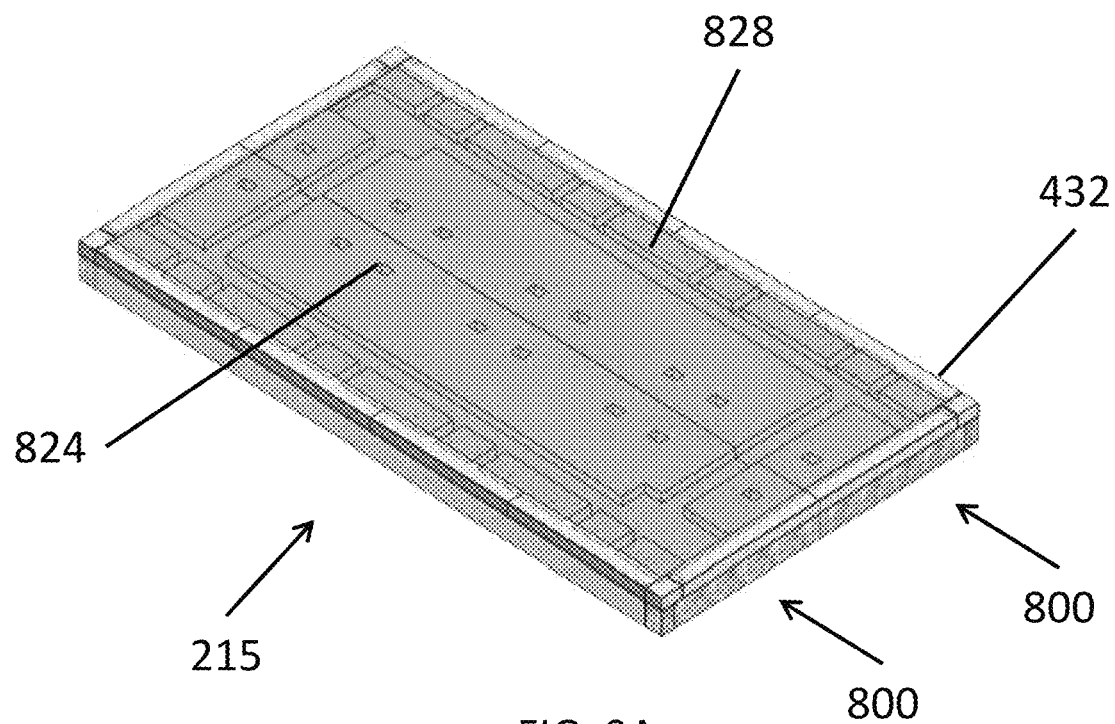
FIGS. 9A and 9B illustrate perspective views of a modular pad according to various embodiments of the present disclosure.
Figure 9B:
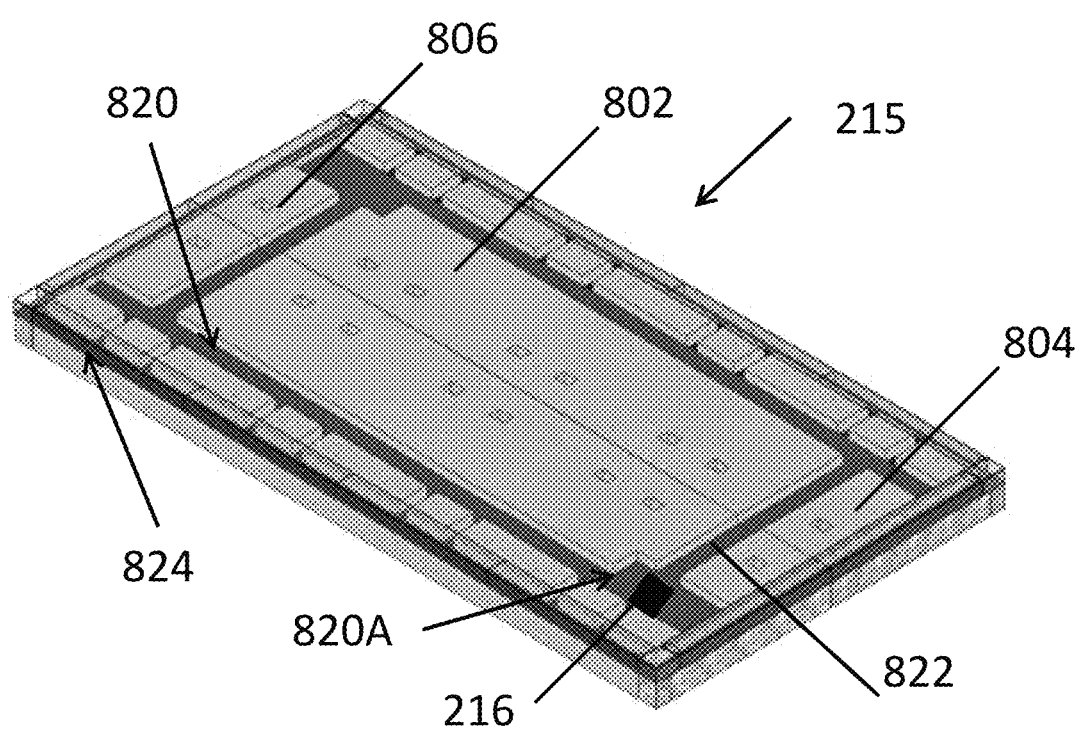

FIGS. 9A and 9B illustrate perspective views of a modular pad 215 according to various embodiments of the present disclosure. The pad 215 may be used as the pad 210 of the fuel cell system 200. Referring to FIGS. 9A and 9B, the pad 215 includes two of the pad sections 800 disposed adjacent to one another. In particular, the pad sections 800 may be disposed flush with one another, and/or may be physically connected to one another.

In particular, each pad section 800 may be configured such that the connection recesses 822 and the plumbing recesses 824 are respectively aligned with one another, when the sections 800 are assembled, as shown in FIGS. 9A and 9B. In other words, the connection recesses 822 of the adjacent pad sections 800 may form contiguous recesses, and the plumbing recesses 824 of two adjacent pad sections 800 may form a contiguous plumbing recess, when the pad sections 800 are aligned with one another. In addition, the pad sections 800 may be aligned such that the second bosses 804 are aligned with (contact) the third bosses 806, and the first bosses 802 are aligned with (contact) one another. In other words, a long side of a first pad section 800 may be disposed in contact with a long side of a second pad section 800 (rotated 180 degrees with respect to the identical first pad section). One or more through holes 216 may be formed the pad sections 800, in order to allow for the routing of plumbing and/or wiring. In particular, a through hole 216 may be formed in the enlarged portion 820A of the wiring recess 820.

Figure 10:
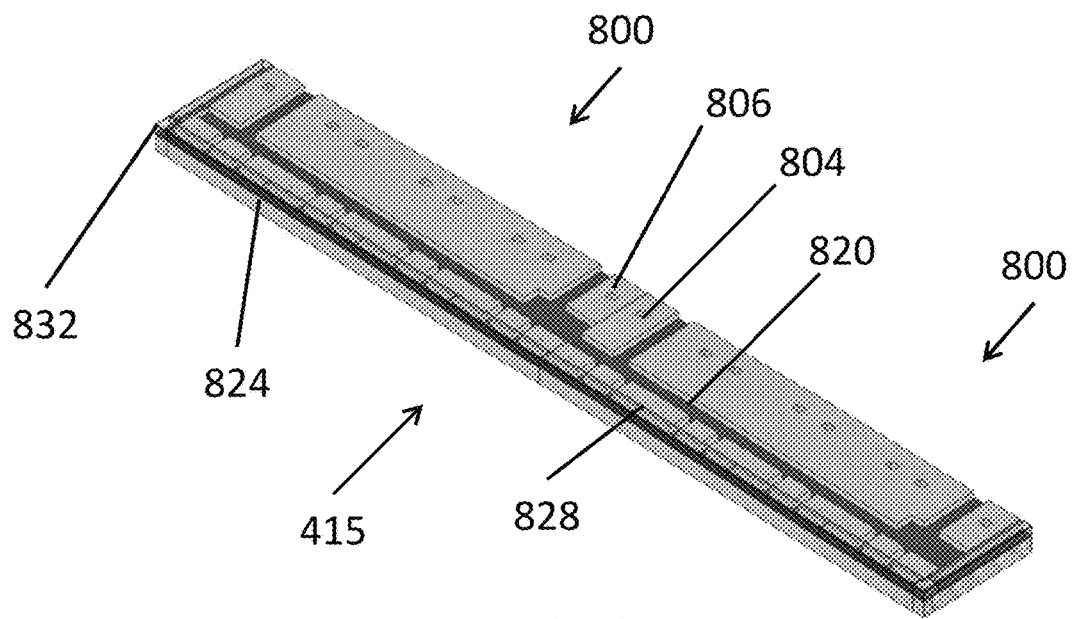
FIG. 10 illustrates a perspective view of a modular pad according to various embodiments of the present disclosure.

FIG. 10 illustrates a perspective view of a modular pad 415 according to various embodiments of the present disclosure. The pad 415 that may be a linear pad that can be substituted for the linear pad 410 of FIGS. 4A and 4B. Referring to FIG. 10, the pad 415 includes two pad sections 800 aligned together lengthwise. In particular, the third boss 806 of one pad section 800 is disposed adjacent to the second boss 804 of the other pad section 800. In other words, a short side of one of the pad sections 800 may be disposed in contact with a short side of the other pad section 800. As such, the wiring recesses 820 and the plumbing recesses 824 of the pad sections 800 may be respectively aligned (contiguous) with one another. In particular, the wiring recesses 820 may be aligned to form a substantially contiguous and linear wiring recess.

Figure 11:
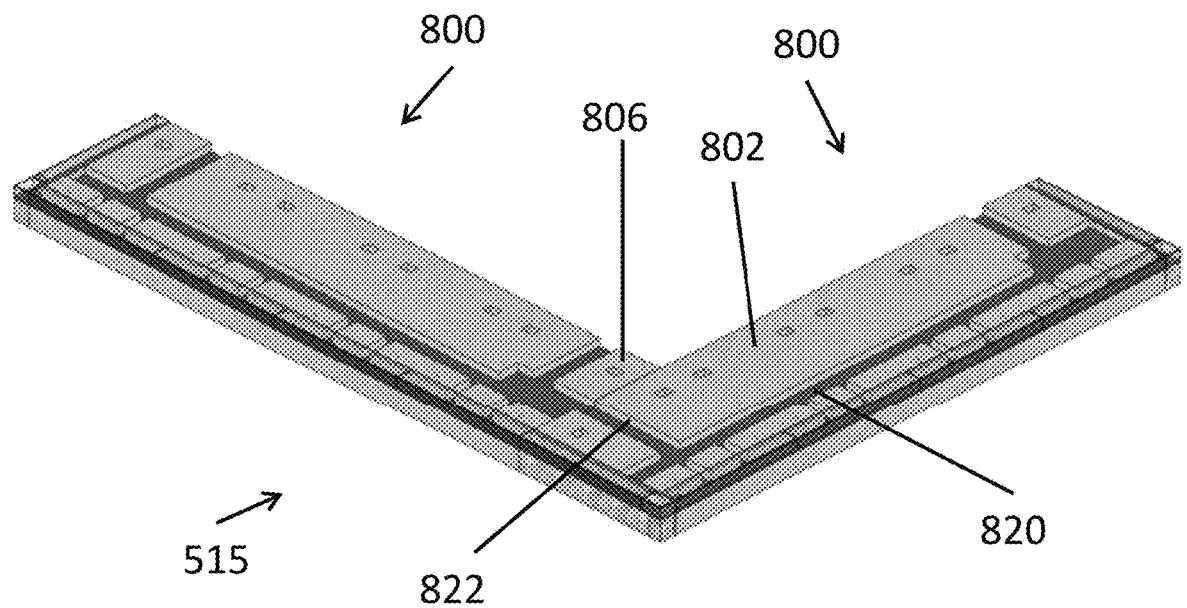
FIG. 11 illustrates a modular pad according to various embodiments of the present disclosure.

FIG. 11 illustrates a modular pad 615 according to various embodiments of the present disclosure. The pad 615 may be substituted for the pad 610 of FIG. 6B.

Referring to FIG. 11, the pad 615 includes two pad sections 800 that are orthogonally aligned together. In particular, the third boss 806 of one pad section 800 is disposed adjacent to the first boss 802 of the other pad section 800. As such, the wiring recesses 820 may be connected by one of the connection recesses 822, and the plumbing recesses 824 of the pad sections 800 may be respectively aligned (contiguous) with one another. In other words, a short side of one pad section 800 may be disposed in contact with a long side of the other pad section 800.

An additional pad section 800 may be aligned with one of the above pad sections 800, such that a step-shaped pad, such as pad 710 of FIG. 7B, may be formed. In other words, each section 712A, 712B, 712C may be formed using one of the pad sections 800.

Figure 12:
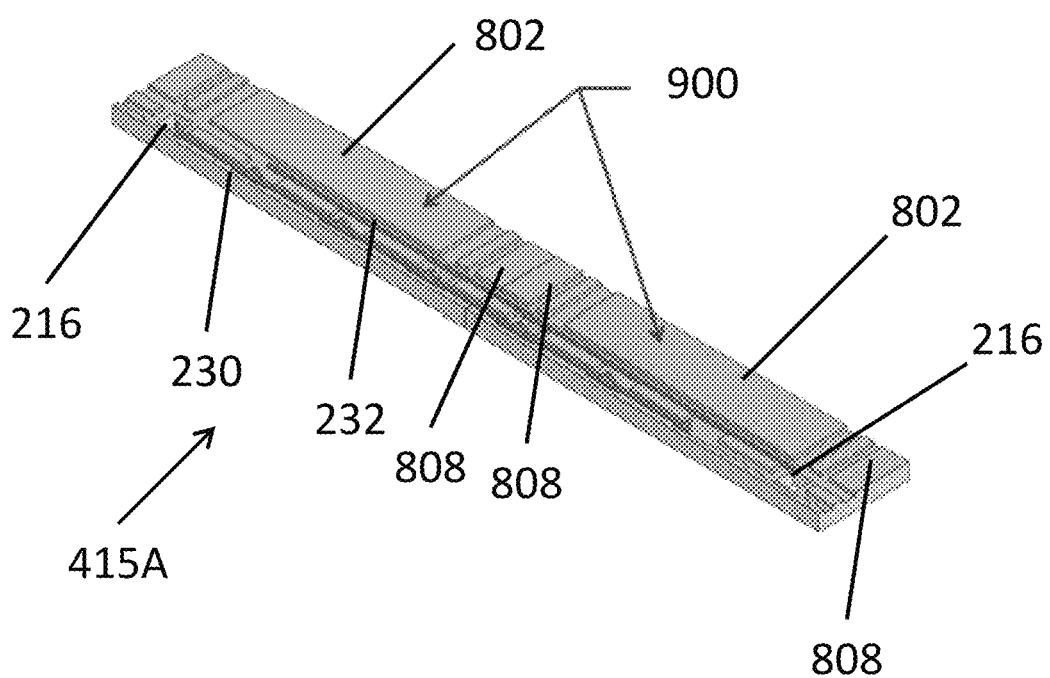
FIG. 12 illustrates a modular pad according to various embodiments of the present disclosure.

FIG. 12 illustrates a modular pad 415A according to various embodiments of the present disclosure. The pad 415A that may be substituted for the pad 410 of FIGS. 4A and 4B.

Referring to FIG. 12, the pad 415A includes two modular pad sections 900. The pad sections 900 are similar to the pad sections 800, so only the differences therebetween will be discussed in detail.

In particular, the pad sections 900 each include a first boss 802 and second bosses 808 disposed on opposing sides of the first boss 804, on an upper surface of the pad section 900. The second bosses 808 may have the same size and shape. Accordingly, the pad sections 900 may be symmetrical widthwise, which is not the case for the pad sections 800, since the pad sections 800 include the second and third bosses 804 and 806 having different sizes. The pad sections 900 may be aligned together in a manner similar to the pad sections 800 in the pad 415, as discussed above.

Figure 13A:
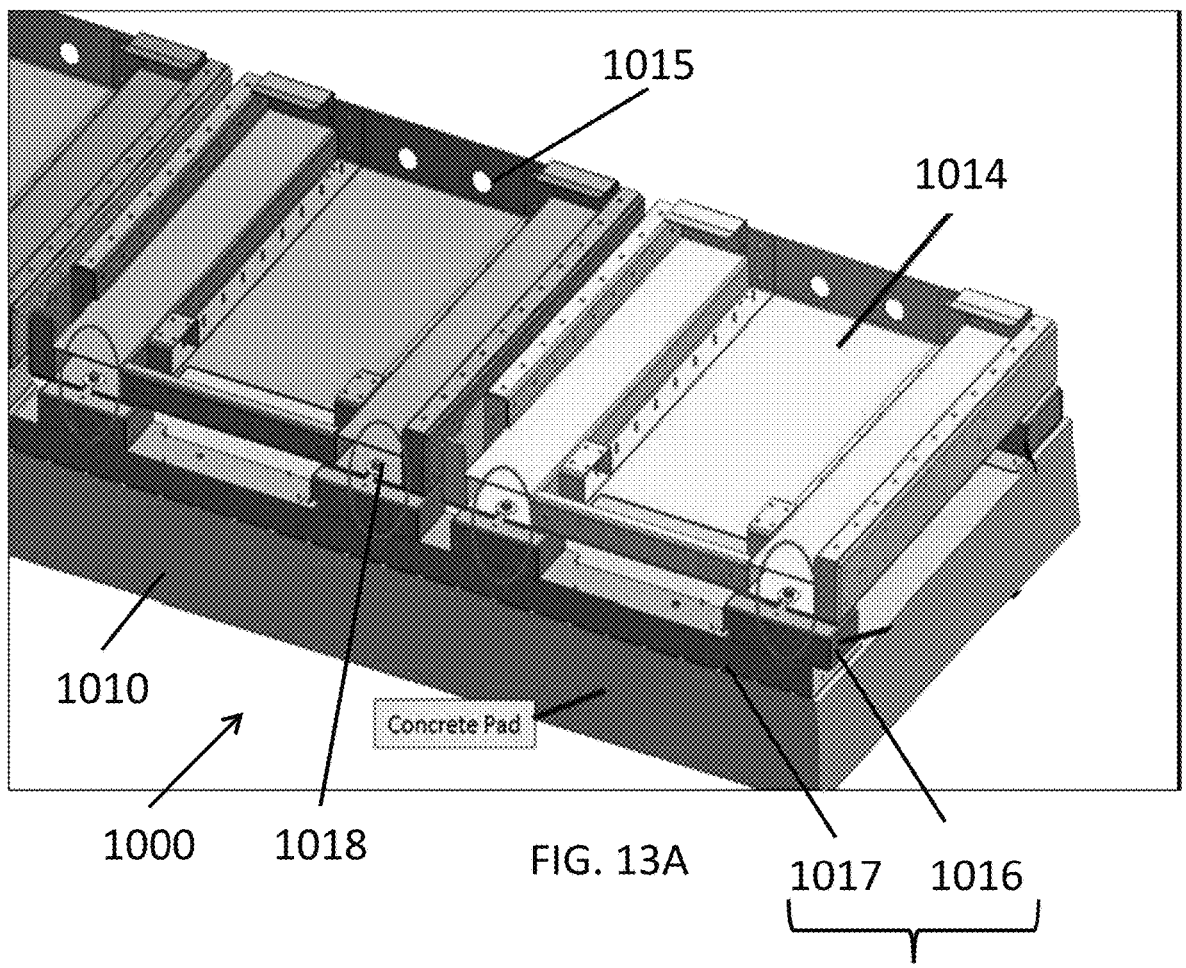
FIGS. 13A and 13B illustrate perspective views of a pad according to various embodiments of the present disclosure.
Figure 13B:
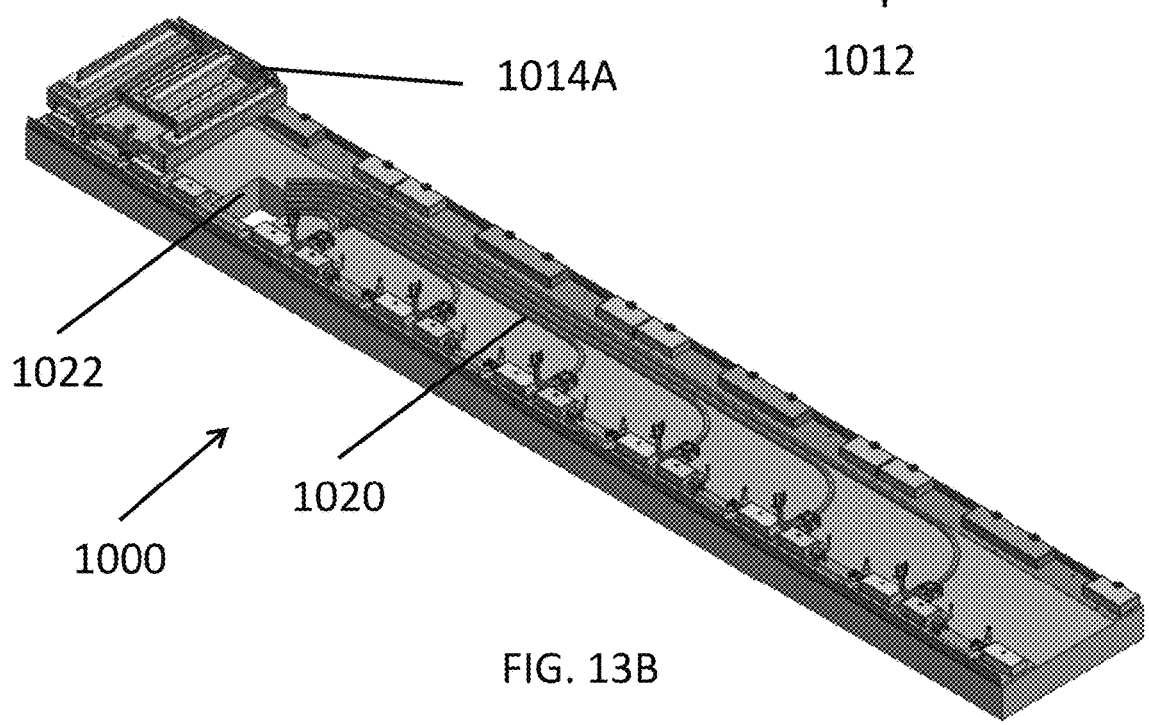

FIGS. 13A and 13B illustrate perspective views of a pad 1000 of a fuel cell system, according to various embodiments of the present disclosure.

Referring to FIGS. 13A and 13B, the pad 1000 may be incorporated into any of the above fuel cell systems. The pad 1000 includes the base 1010, a separator 1012, and frames 1014. The base 1010 may be formed of concrete or similar material, as described above. In particular, the base 1010 may be cast on site, or may be precast in one or more sections and then assembled on site.

The separator 1012 may be disposed on an upper surface of the base 1010, and may be formed of sheet metal or other similar material. The separator 1012 may include rails 1017 disposed on opposing sides of the base 1010, and spacers 1016 disposed on the rails 1017. The rails 1017 may be single pieces, or may include connected rail sections.

The frames 1014 may be attached to the spacers 1016 using any suitable method, such as by using bolts 1018, clamps, or the like. The frames 1014 are configured to receive modules, such as power modules, fuel processing modules, or the like. The separator 1012 may be configured to separate the base 1010 and the frames 1014, such that there is a space formed therebetween.

The pad 1000 may include plumbing 1020 disposed on the base 1010. The plumbing 1020 may extend from a through hole 1022 formed in the base 1010, and may be configured to provide water and/or fuel to modules disposed on the frames 1014. The pad 1000 may include a frame 1014A configured to receive a power conditioning module. The pad 1000 may also include wiring (not shown) configured to connect the power modules to a power conditioning module disposed on the frame 1014A. In the alternative, wiring could be routed through openings 1015 formed in the frames 1014.

The separator 1012 is configured to space apart the frames 1014 from the upper surface of the base 1010. Accordingly, the plumbing 1020 may be disposed directly on the upper surface of the base 1010. In other words, the upper surface of the base 1010 may be substantially planar, e.g., does not need to include recesses for the plumbing 1020 and/or wiring.

The configuration of the pad 1000 provides advantages over conventional pads, in that plumbing and/or wiring is not required to be set into features cast into the base 1010, in order to have a flat surface for the installation of fuel cell system modules. As such, the pad 1000 may be manufactured at a lower cost, since the base 1010 does not require cast features.

Figure 14:
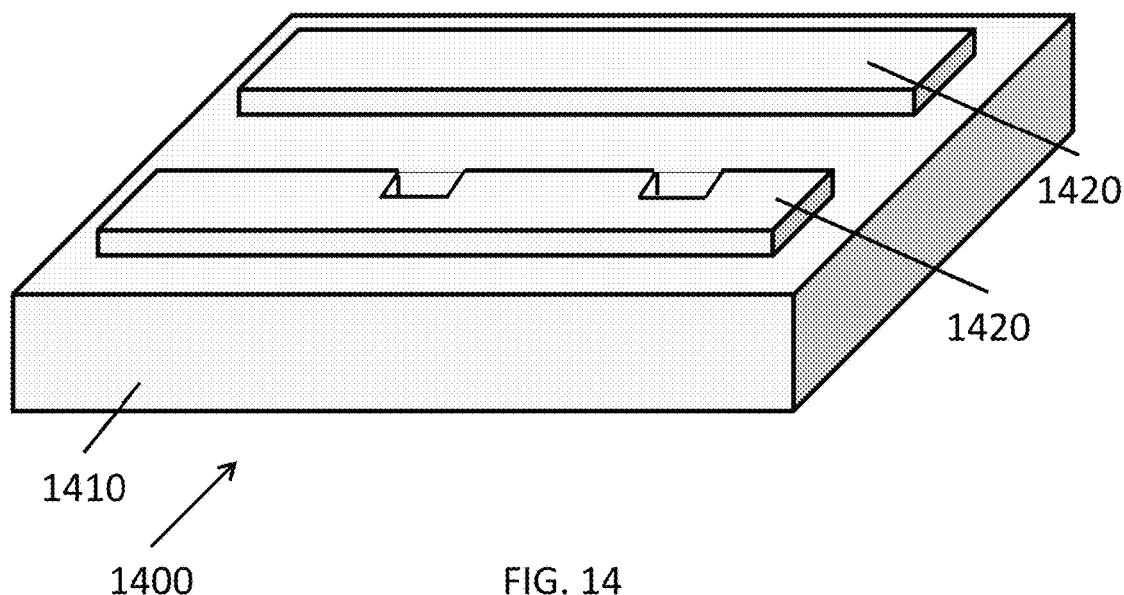
FIG. 14 is a perspective view of a modular pad of a fuel cell system, according to various embodiments of the present disclosure.

FIG. 14 is a perspective view of a pad 1400 for a fuel cell system, according to various embodiments of the present disclosure. Referring to FIG. 14, the pad 1400 includes a base 1410 and replicators 1420 disposed on the base 1410. The base 1410 may be a cast on site or precast and delivered to a site. The base 1410 may be formed of concrete or a similar material.

The replicators 1420 may be attached to the base 1410 and may be formed of plastic or other non-corrosive material. The replicators 1420 may replicate features that are molded into bases of the previous embodiments described above. For example, the replicators 1420 may form bosses such that wiring and/or plumbing channels or recesses are formed on a flat upper surface of the base 1410 between the replicators 1420. Accordingly, the replicators 1420 may create an elevated structure for supporting the modules 12, 16, 18 of a fuel cell system, while the wiring and plumbing is formed on the flat upper surface of the concrete base 1410 in the channels or recesses between the replicators. The replicators 1420 may also be used as templates for drilling features into the base 1410. The replicators 1420 may be attached (e.g., snapped) together and/or attached to the base 1410 using any suitable attachment methods, such as being molded onto the upper base surface.

According to some embodiments, multiple pads 1400 may be attached to one another as pad sections, to create a larger pad 1400. For example, the pads 1400 could be connected using "living hinges" on pad plumbing covers, which may snap lock into position. In other words, the pad 1400 may be considered a pad section, according to some embodiments.

Figure 15:
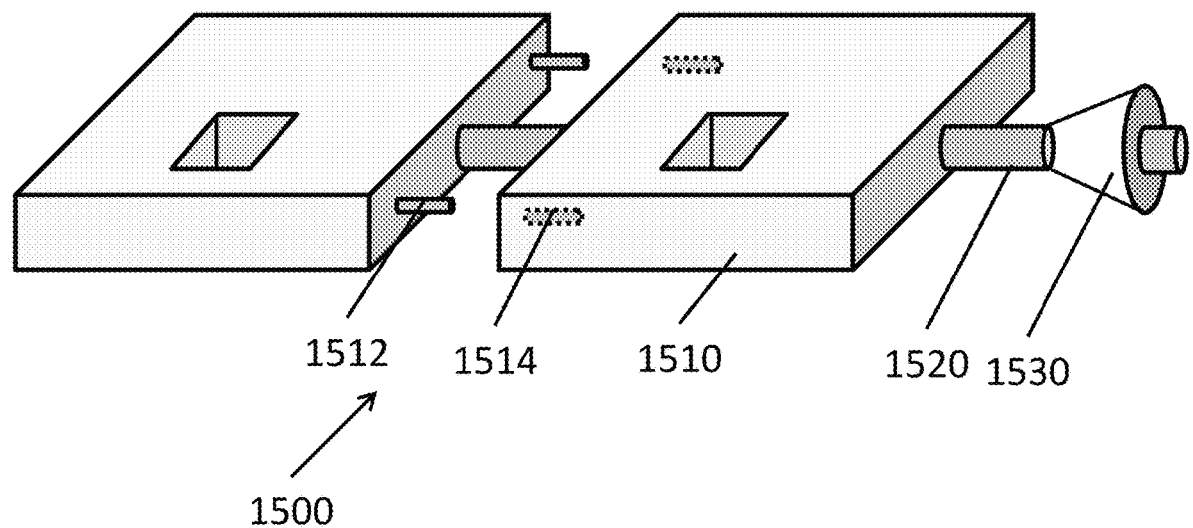
FIG. 15 is a perspective view of a modular pad of a fuel cell system, according to various embodiments of the present disclosure.

FIG. 15 is a perspective view of a pad 1500 for a fuel cell system, according to various embodiments of the present disclosure. Referring to FIG. 15, the pad 1500 includes pad sections 1510 and a tension cable 1520. While one tension cable 1520 is shown, multiple tension cables 1520 may be included. The tension cable 1520 is configured to connect the pad sections 1510. In particular, wedges 1530 may be disposed on the tension cable 1520 to bias the pad sections 1520 together. While one wedge 1530 is shown, wedges may be disposed on opposing ends of each tension cable 1520.

The pad sections 1510 may further include alignment pins 1512 and alignment holes 1514. In particular, the alignment pins 1512 may be interested into the alignment holes 1514, in order to align the pad sections 1520 with one another. According to some embodiments, the alignment pins 1512 may be pyramid-shaped and the alignment holes 1514 may have a corresponding shape, in order to facilitate alignment of the pad sections 1510.

Figure 16:
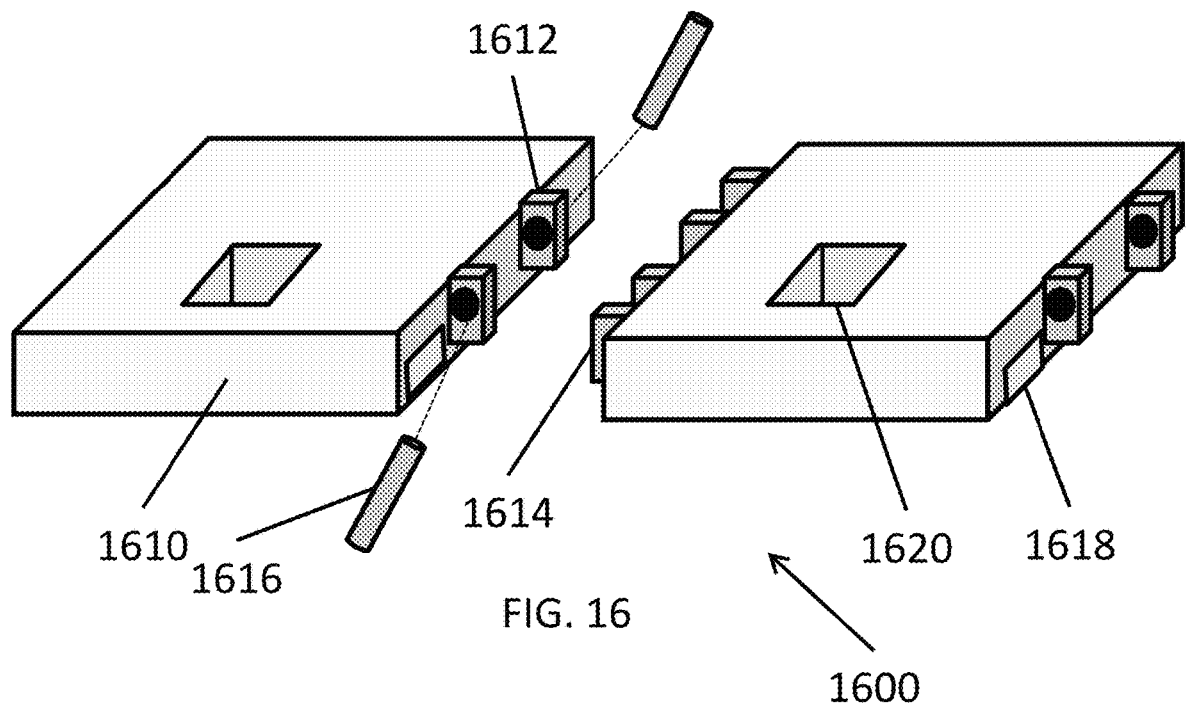
FIG. 16 is a perspective view of a modular pad of a fuel cell system, according to various embodiments of the present disclosure.

FIG. 16 is a perspective view of a pad 1600 for a fuel cell system, according to various embodiments of the present disclosure. Referring to FIG. 16, the pad 1600 includes pad sections 1610 that are connected together. In particular, the pad sections 1610 include first and second brackets 1612, 1614, which mate with one another and are locked together with pins 1616 inserted there through. The pad sections 1610 may include recesses or cut-outs 1618 that may provide space for plumbing and/or wiring. The plumbing and/or wiring may be fed through the pad sections 1610 to holes 1620 formed therein. The configuration of the pad 1600 may allow for the pad 1600 to have various shape and/or sizes. In some embodiments, the pad sections 1600 may be disposed on a relatively thin concrete pad.

Figure 17:
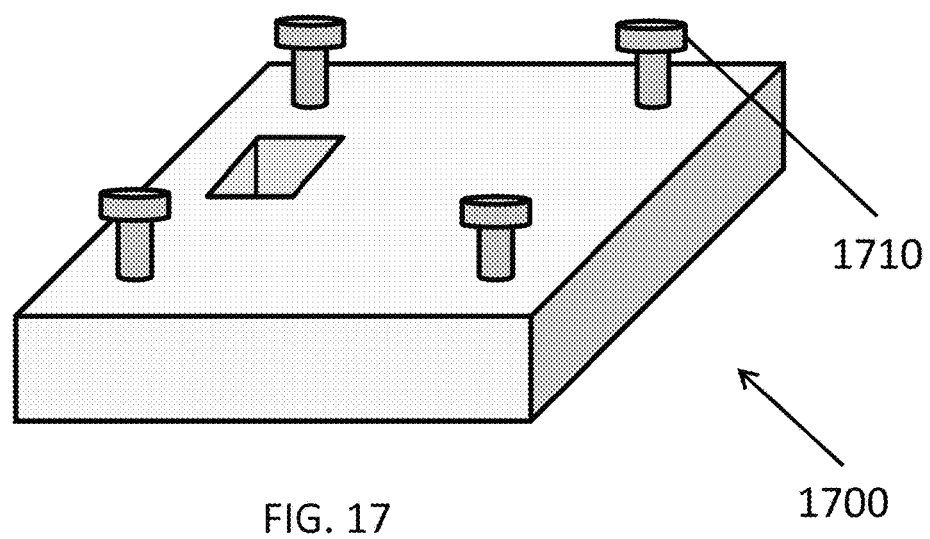
FIG. 17 is a perspective view of a pad section of a fuel cell system, according to various embodiments of the present disclosure.

FIG. 17 illustrates a pad section 1700 of a fuel cell system, according to various embodiments. Referring to FIG. 17, the pad section 1700 includes tie downs 1710 extending from an upper surface thereof. The tie downs 1710 may be formed of forged or toughened metal, and may be inserted into the pad during or after fabrication. The tie downs 1710 may be mushroom shaped, and may allow for the blind installation of a module on the pad section 1700. As such, the tie downs 1710 allow for a module to be more easily attached to the pad section 1700, since the tie downs 1710 are self-guiding.

Figure 18A:
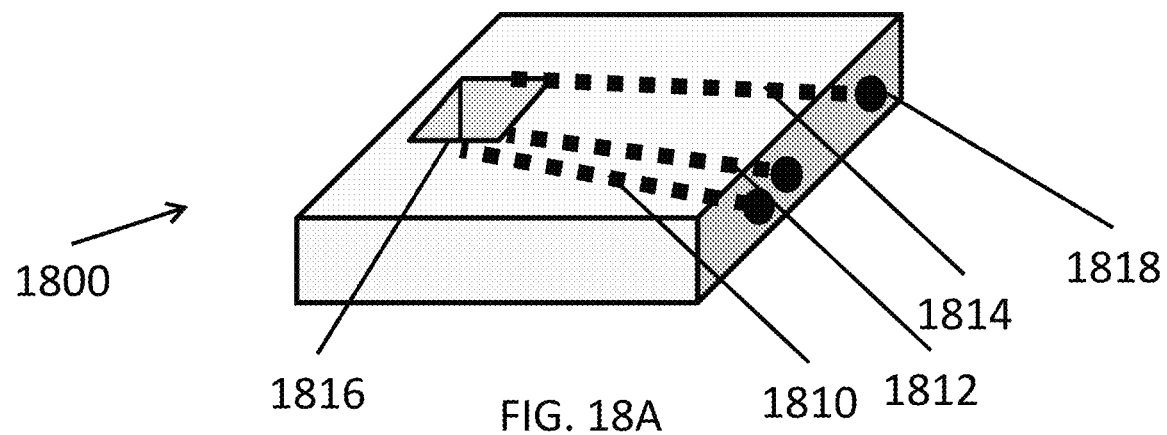
FIG. 18A is a perspective view of a support frame of a fuel cell system.

FIG. 18A illustrates a support frame 1800 of a fuel cell system, according to various embodiments. The support frame may include water plumbing 1810, fuel plumbing 1812, and electrical wiring 1814, which may extend between a hole 1816 in the support frame 1800 and quick connects 1818.

Figure 18B:
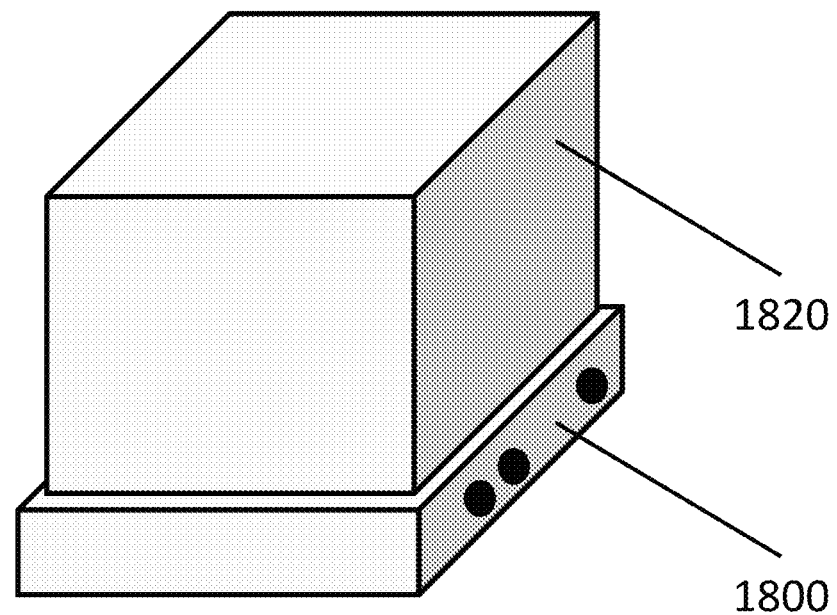
FIG. 18B illustrates a module on the support frame of FIG. 18A.

The support frame 1800 may be attached and prewired to a module 1820 of a fuel cell system as shown in FIG. 18B at a manufacturing site and then shipped to a site for assembly where the fuel cell system will generate power. The pre-attached frame 1800 may be similar to the frame 1014 shown in FIG. 13A. Accordingly, assembly of a fuel cell system may be simplified.

The arrangements of the fuel cell system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein.

Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present disclosure. Any one or more features of any embodiment may be used in any combination with any one or more other features of one or more other embodiments.

The invention claimed is:

1. A modular pad of a fuel cell system, comprising at least one pad section that comprises:
   bosses disposed in a first row;
   plumbing brackets disposed in a second row that is parallel to the first row;
   a wiring recess extending between the plumbing brackets and the bosses;
   connection recesses extending from the wiring recess and between the bosses; and
   a plumbing recess extending along at least one edge of the pad section;
   wherein:
   the pad comprises first and second pad sections, each having two short sides that extend between two long sides; and
   the first and second pad sections are aligned in an orthogonal configuration, such a short side of the first pad section contacts a long side of the second pad section.

2. A modular pad of a fuel cell system, comprising at least one pad section that comprises:
   bosses disposed in a first row;
   plumbing brackets disposed in a second row that is parallel to the first row;
   a wiring recess extending between the plumbing brackets and the bosses;
   connection recesses extending from the wiring recess and between the bosses; and
   a plumbing recess extending along at least one edge of the pad section;
   wherein:
   the pad comprises first, second, and third pad sections, each having two short sides that extend between two long sides; and
   the first, second, and third pad sections are aligned in a stepped configuration, such that the short sides of the second pad section contact long sides of the first and third pad sections.

3. A fuel cell system comprising fuel cell power modules disposed on the modular pad of claim 1.

4. A fuel cell system comprising fuel cell power modules disposed on the modular pad of claim 2.

* * * * *